United States Patent
Franz et al.

(10) Patent No.: US 8,140,371 B2
(45) Date of Patent: Mar. 20, 2012

(54) PROVIDING COMPUTING SERVICE TO USERS IN A HETEROGENEOUS DISTRIBUTED COMPUTING ENVIRONMENT

(75) Inventors: Joachim Franz, Althengstett (DE); Michael Gerber, Koeckem (DE); Matthias Gruetzner, Schoenaich (DE); Wilhelm Spruth, Boeblinger (DE)

(73) Assignee: International Business Machines Corporation, Armonk, NY (US)

( * ) Notice: Subject to any disclaimer, the term of this patent is extended or adjusted under 35 U.S.C. 154(b) by 1798 days.

(21) Appl. No.: 11/354,488

(22) Filed: Feb. 15, 2006

(65) Prior Publication Data

US 2006/0190605 A1    Aug. 24, 2006

(30) Foreign Application Priority Data

Feb. 18, 2005    (EP) .................................. 05101221

(51) Int. Cl.
  *G06Q 10/00*    (2006.01)
  *G06F 9/46*    (2006.01)
(52) U.S. Cl. .................... 705/7.23; 705/7.25; 705/7.12; 718/104
(58) Field of Classification Search .................. 709/226, 709/224, 225, 229, 217, 219, 220–223, 231, 709/235; 710/36–40, 107, 200, 240–244; 711/150, 151; 705/7.11, 7.12, 7.22, 7.23, 705/7.29–7.33, 26.1–26.64, 28–32, 37, 300, 705/301, 400, 1.1, 7.24, 7.25, 7.26, 7.38, 705/26.3, 26.4, 26.41, 26.43, 26.44; 700/100–108, 700/200, 201, 219, 225, 226, 229, 238, 243, 700/244, 245; 718/102, 104
See application file for complete search history.

(56) References Cited

U.S. PATENT DOCUMENTS

| | | | |
|---|---|---|---|
| 6,516,350 B1 | 2/2003 | Lumelsky et al. | |
| 6,928,477 B1* | 8/2005 | Leymann et al. | 709/226 |
| 6,965,930 B1* | 11/2005 | Arrowood et al. | 709/223 |
| 7,861,246 B2* | 12/2010 | Lu et al. | 718/102 |
| 2002/0095366 A1* | 7/2002 | Chang | 705/37 |
| 2003/0028640 A1* | 2/2003 | Malik | 709/226 |
| 2004/0044718 A1* | 3/2004 | Ferstl et al. | 709/200 |
| 2004/0083475 A1 | 4/2004 | Todd et al. | |
| 2004/0139144 A1 | 7/2004 | Batra et al. | |
| 2006/0173883 A1* | 8/2006 | Pierce et al. | 707/101 |

OTHER PUBLICATIONS

Cao, J. et al, "A Dynamically Reconfigurable System Based on Workflow and Service Agents," Engineering Applications of Artificial Intelligence, Pineridge Press, Swansea, GB, vol. 17, No. 7, Oct. 2004, pp. 771-782.

Foster, I. et al, "The Physiology of the Grid: An Open Grid Services Architecture for Distributed Systems Integration," Globus Publications Research Papers, Jun. 22, 2002, pp. 1-31.

Jin, X. et al, "Characterizing Autonomic Task Distribution and Handling in Grids," Engineering Applications of Artificial Intelligence, Pineridge Press, Swansea, GB, vol. 17, No. 7, Oct. 2004, pp. 809-823.

(Continued)

*Primary Examiner* — Igor Borissov
(74) *Attorney, Agent, or Firm* — Winstead, P.C.

(57) ABSTRACT

For providing a service-centric approach to allocating computing service power to users in a heterogeneous distributed computing environment such as a grid, a grid service broker comprises a central service broker and distributed service brokers. Service power is measured in resource-independent service units defined and used by the service broker. The central service broker uses meta-scheduling for distributing service requests to the distributed service brokers, based on projected service units needed to process the service requests.

25 Claims, 22 Drawing Sheets

OTHER PUBLICATIONS

Examination Report for Application No. 061015129.9 from European Patent Office dated Oct. 21, 2011.
Gerber, Michael, "Architektur und Implementierung eines Kommerziellen Grid Resource Brokers auf Basis der Globus Infrastruktur," Aug. 2004 (English translation of Chapter 1).
Ferreira et al., "Introduction to Grid Computing with Globus," Sep. 2003.
Buyya, Rajkumar, "Economic-based Distributed Resource Management and Scheduling for Grid Computing," Apr. 12, 2002.

* cited by examiner

PROVIDING COMPUTING SERVICE TO USERS IN A HETEROGENEOUS DISTRIBUTED COMPUTING ENVIRONMENT

FIELD OF THE INVENTION

The present invention generally relates to a system, method, computer program product, and business method for providing computing service to users in a heterogeneous distributed computing environment such as a grid computing environment.

BACKGROUND

In the traditional approach to providing computing service, a service user requests computing service from a service provider. In most cases, the service user has a direct relationship with the service provider, which may include contracts and service level agreements for specific computing services. The service provider manages the computing resources such as processing, storage, networking, and the like, on a resource level, using resource management tools such as load balancers, resource managers, and the like. These tools are optimized to allow for a level of high resource utilization in order to maximize profit. The service user pays for computing service power based on resource usage and a price structure contracted with the provider. The resource usage and price structure is more or less static in nature, and may be covered by the service provider for peak-level demands based on fixed contracts with the service user.

In a grid-computing environment, however, the relationship between service user and service provider changes, due to the dynamic and heterogeneous nature of the environment. More specifically, a direct relationship to a specific service provider may not continue to be the standard case.

Grid computing provides efficient and flexible use of resources, which reduces costs and opens new opportunities. Today, the application of grid computing is found primarily in areas that require large-scale computation, such as risk analysis in finance, digital rendering in telecommunication and media, mechanical and electrical design, finite element analysis, failure analysis in manufacturing, reservoir analysis in energy planning, and so on. However, in addition to such computationally intense activities, a demand for grid computing is now emerging in the commercial information technology business.

All these applications create a demand for resources on the grid. Fundamentally, these demands draw on the lowest level processors, storage, and bandwidth, all of which are called on to phase dynamic requests. Additionally, in its most general form, a grid is a large, shared, heterogeneous, resource pool that crosses intra-and/or inter-organizational boundaries, and is not limited to peer-to-peer relationships.

The concept of coupling geographically distributed computing resources for solving large-scale computing problems is becoming increasingly popular, and is often called grid computing. The management of resources in the grid environment is becoming complex, as these resources may be geographically distributed, heterogeneous in nature, and owned by different individuals and organizations that each have their own resource management policies, access process, and cost models. In addition, a shift from the large-scale computational grid environment where users request specific resources for a given amount of time to a more service oriented grid environment where grid users request services requires a new approach for scheduling, making reservations, and processing.

Most of the solutions known today which try to resolve the resource allocation and job scheduling problems are resource-centric. This means that the scheduling and allocation process works on a low level for specific resources. These mechanisms are mainly implemented in load balancer and resource manager components as part of a homogeneous system environment, with the main focus being to share these resources among multiple service users. Several of these approaches have included auction mechanisms to assist in the allocation of computing resources.

Most of the related work in grid computing dedicated to resource management and scheduling problems adopts a conventional style, where a scheduling component decides which jobs are to be executed at which sites based on predetermined cost functions. Such cost functions are often driven by resource-centric parameters that enhance system throughput and utilization rather than improve profit. They assume that resources all cost the same and that the results of all applications have the same value, even though this may not be the case in reality. The service user does not want to pay the highest price, of course, but wants instead to negotiate a better price based on demand, supply, market value, priority, and available budget. Also, the results of different applications have different values at different times based on different operational risks for processing.

In a grid environment, a service user may be in competition with other service users, and a service provider may be in competition with other service providers. A new research area called grid economics concerns these aspects. Grid economics attempts to provide economically sound business analysis and software products, intended to help organizations manage the financial aspects of shared information technology (IT) resources and services. This new field draws upon the knowledge and techniques of several fields such as e-commerce (e-auctions, e-marketplaces), market design (common practices in established markets), stochastic optimization (portfolio theory, derivatives, real options), commodity markets (pricing and risk for electricity, oil, etc.), network bandwidth pricing, and market-based control (artificial economies).

The key to any acceptable solution is a business driven approach, which needs to answer questions like: which service request gets what, when, how much, and what service guarantee? These are followed by questions concerning the value of pre-reserved service slots in the future, including the question of how this value will change as a function of time. Clearly, today's solutions that concern lower level grid products specified by CPU, memory, and bandwidth are not adequate to answer these questions.

Standalone auction mechanisms to allocate computing resources as services are not sufficient to solve the scheduling and reservation problems, although an auction can be used as a guide to finding an actual market price. This is necessary but not sufficient to optimize the profit for a service provider.

Current implementations of grid brokers use some type of auction mechanisms lead by the service user (jobs bidding for resources) to optimize the budget and the resource allocation. From a service provider's perspective, however, a modified auction mechanism lead by the service provider (resources bidding for jobs) is needed to optimize profit.

Standard auction mechanisms face performance issues during the negotiation phase due to the large number of auction runs and re-tries necessary to handle individual jobs. This leads to a tremendous overhead in communication and poor response times.

SUMMARY

The present invention provides a new approach to how service requestors and service providers use computing resources, including new methods for communicating and for allocating computing resources within a distributed heterogeneous computing environment.

Aspects of the invention include trading computing service power measured in service units. These service units are resource independent and generally transformable in a distributed heterogeneous computing environment. A service broker component is used to trade service power between service requestors and service providers.

The service broker may include a central service broker part and a distributed service broker part running within a service provider domain. A service provider domain itself can contain multiple processing domains (heterogeneous computing systems such as grids or clusters). The service provider domain is managed by the central service broker part communicating with each of its distributed service broker parts which are running in the processing domains. A novel meta-scheduling service is used to distribute the service requests to the processing domains. The distributed service broker uses the capabilities of local resource managers or workload managers to dispatch service requests for final processing and to fulfill the service providers' objectives.

In order to optimize profit for the service provider domain, a new method called here Band Distribution Algorithm for Processing Domains (BDAFPD) is used by the service broker to allow a multi-objective optimization for the distribution (scheduling) of service requests to processing domains (meta-scheduling service). In addition, the BDAFPD correlates service requests to specific business products and business processes of the service provider domain in order to allow for service-centric processing using a band mapping unit. A novel feature implemented by the service broker is a method to dynamically adapt the service power supply for processing domains to the present and expected future demand. This is mainly handled by a dynamic band management component band transformer.

The distributed service broker part uses an advanced reservation scheme to plan the traded service power. The reservation scheme allows for the planning of service power requests and service power reservation requests. A basic reservation unit is represented by a reservation slot which represents a fixed or variable capacity increment of service power in a single period of time. Using the advanced reservation scheme, the distributed service broker is able to optimize the processing according to quality-of-service (QoS) parameters such as timeline, elapse-time, utilization, and profit optimization targets by smoothing peak-load demands over periods of time. This can be based on historical time series analysis using, for example, performance index data or profit data collected by a data collection service over time and evaluated by a data historical simulation service.

An on-demand value calculation (ODVC) performed by the distributed service broker part is used to represent a processing-domain-specific market value for service requests. It allows for an optimized auction process for trading service power which is needed to process service requests. The novel auction process which can be used by the service broker is called here a "capacity sealed bid auction."

BRIEF DESCRIPTION OF THE DRAWINGS

The invention will be best understood by reference to the following detailed description of an illustrative embodiment when read in conjunction with the accompanying drawings, wherein.

DETAILED DESCRIPTION

The basic components of the inventive service broker are described here in conjunction with a grid environment. However, the invention is not so limited, and the basic components of the present invention may also be used in any distributed heterogeneous or homogeneous computing environment.

The inventive approach provides new components and a new communication structure for the grid computing environment. A major component newly introduced by the present invention is a service broker, which may be called a grid service broker in the grid environment, which implements mediator type brokering services for unique computing service power between grid service users and grid service providers. The grid service broker abstracts computing resources to the level of computing service power measured in service units. It includes a meta-scheduler for economic optimization model level 3 (EOML3).

A grid service user, which could be a human end user, automated process, application system, or the like, needs computing service power to process service requests such as business products. The demand for computing service power is recognized by the grid service broker component, which is part of a grid service provider environment. The central grid service broker part of the grid service broker forms a unique service-request based on the grid service users requirements, and negotiates this request, using an economic optimization model level 3, with its distributed broker counterparts running in each grid processing domain. The distributed brokers connect to local resource managers to perform the final processing of service requests. The grid service user pays for the service power delivered to the grid service broker.

Figure 1:
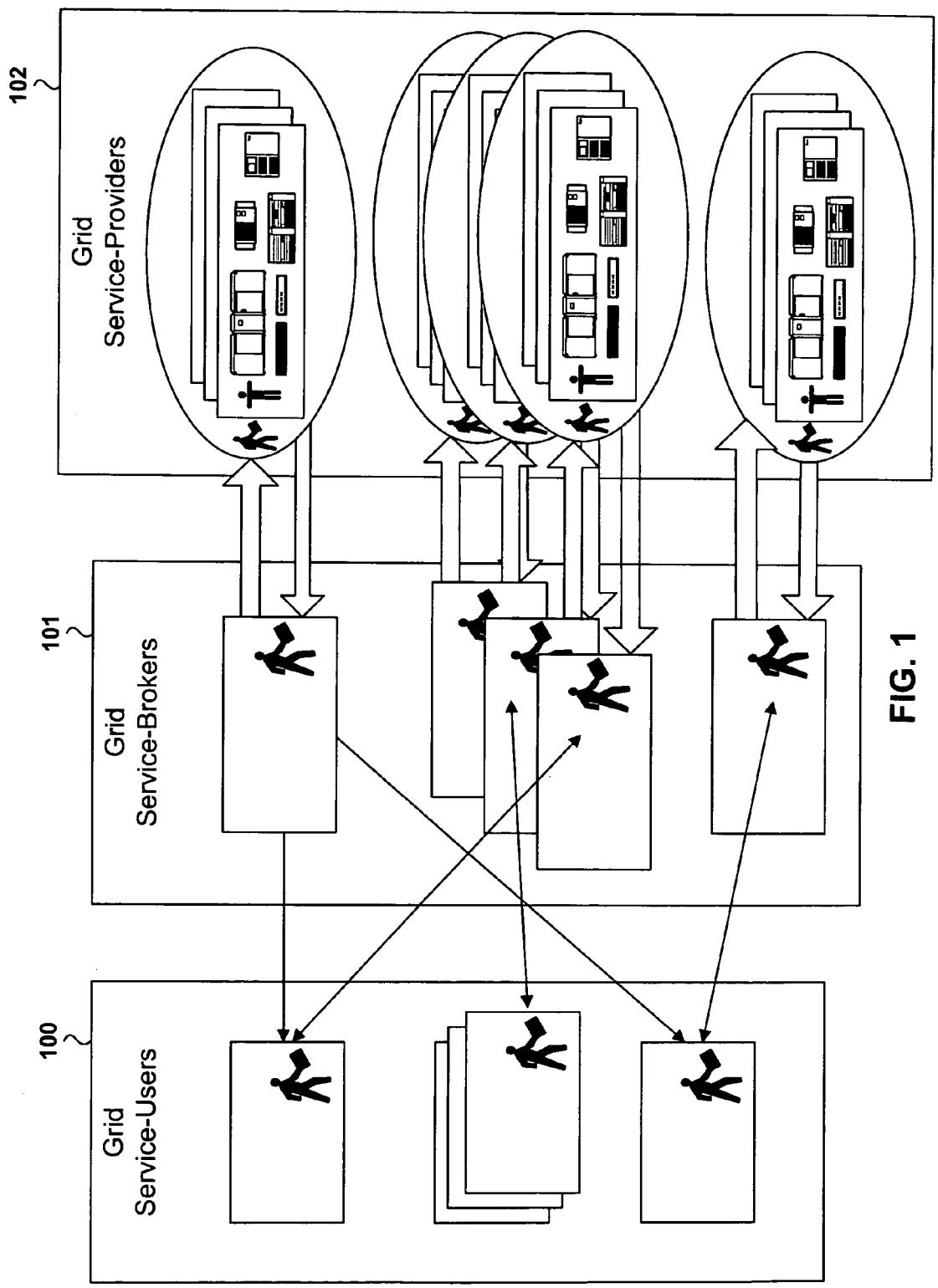
FIG. 1 shows aspects of using grid service brokers to trade computing service power from different grid service providers.

The general use of the inventive grid service broker approach is shown in FIG. 1, which shows grid service users 100 demanding computing service power from grid service providers 102. This is done by grid service brokers 101 trading the computing service power of each individual service provider. The service provider could run several grid domains, which are covered by the grid service broker, looking to the grid service user as a single service provider domain. There is no longer a direct computing resource use by a service user, due to the abstraction of the computing resources to the level of computing service power performed by the grid service broker.

The following describes the software architecture of the inventive grid service broker. The grid service broker may be structured as a central grid service broker and distributed grid service brokers, performing the main tasks described in FIGS. 2-16. Each component of the grid service broker is described below.

Figure 2:
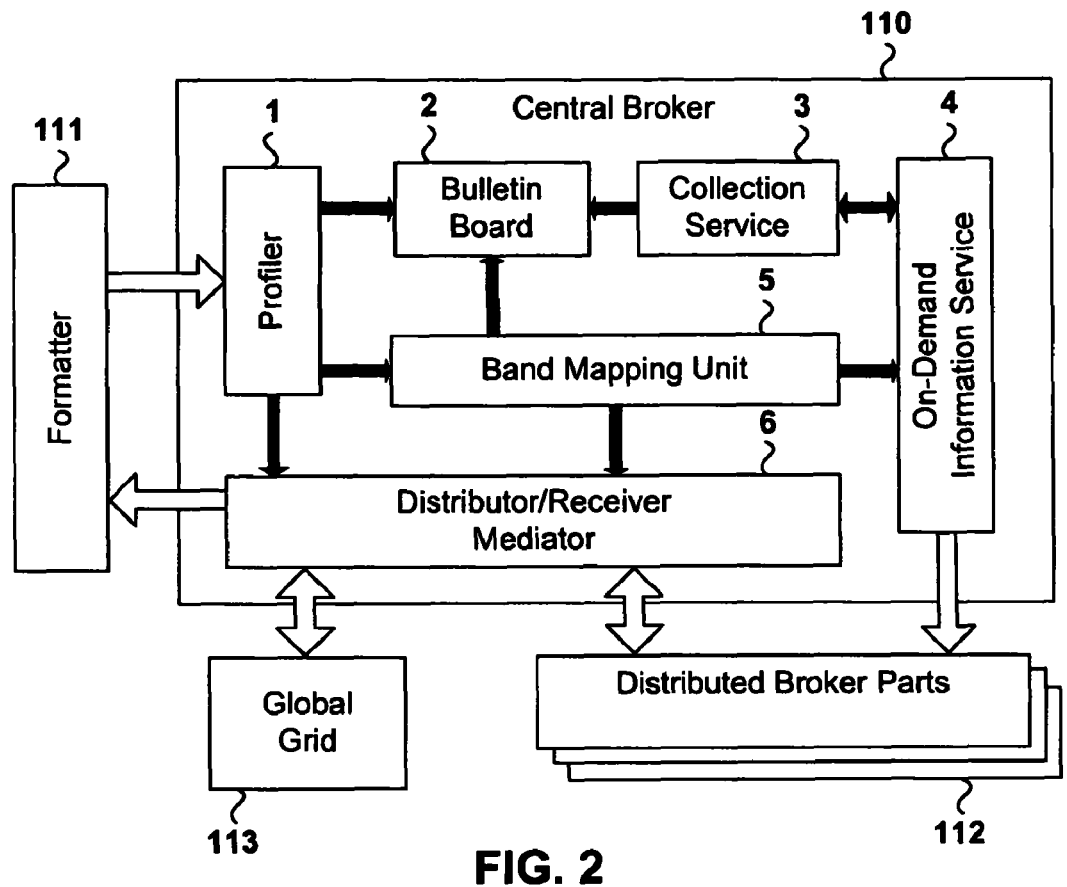
FIG. 2 shows the inventive grid service broker infrastructure including a central service broker part and a distributed grid service broker part.

The central grid service broker 110 may include the major components shown in FIG. 2, which are a formatter 111, distributed brokers 112, and global grid 113.

Figure 3:
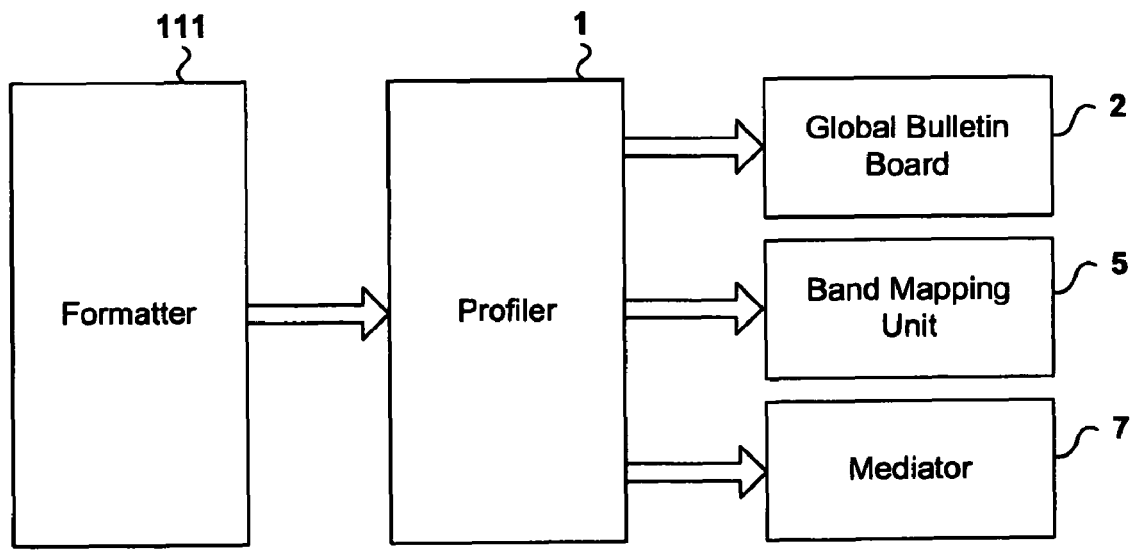
FIG. 3 shows a profiler component as part of the inventive central grid service broker part.

The formatter 111, which is not necessarily a part of the grid service broker 110, receives incoming service requests from the service users 100. The pre-formatted service request work unit (SRWU) is given to a profiler 1 component of the central service broker 110. As shown in FIG. 3, the profiler 1 has access to a global bulletin board 2, a band-mapping unit 5, and a mediator 7.

The profiler 1 checks authorization and the requirements of service requests demanding service power such as. for example, customer service elements (CSE) and quality of service (QoS) profiles. It initializes the SRWU with information about QoS, projected service units needed to process the SRWU (PSUN), and band type. This is done by using the global bulletin board 2. The global bulletin board 2 provides storage structures to maintain grid service broker information such as profiles, history tables, statistical data such as time series, and the like.

Figure 4:
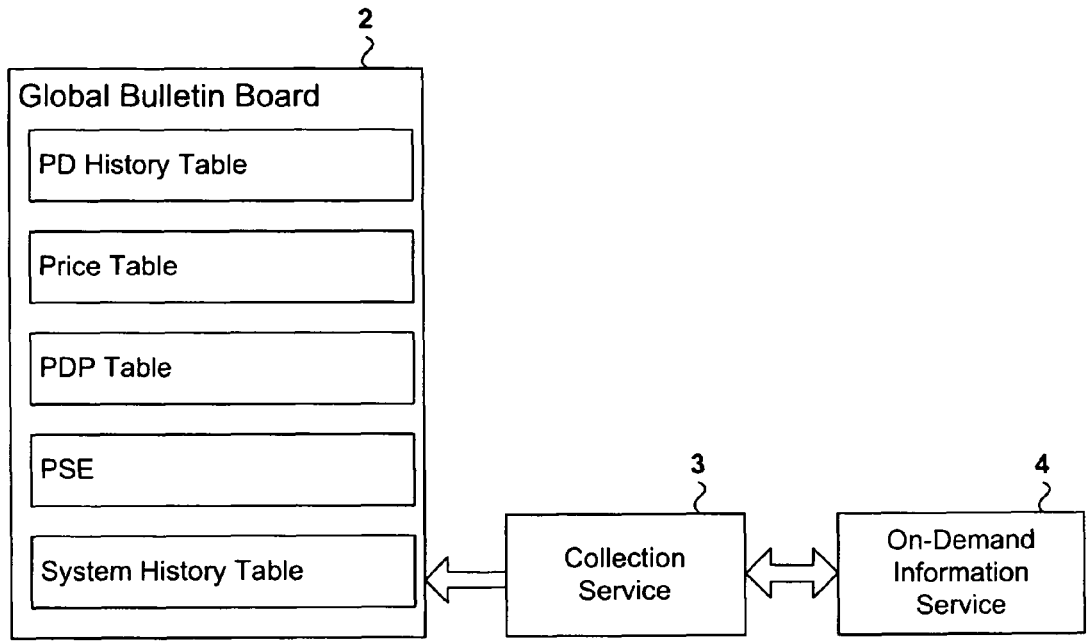
FIG. 4 shows a global bulletin board and collection service as part of the central grid service broker part.

FIG. 4 shows an exemplary structure of the global bulletin board 2, which includes the various tables. Also shown is a collection service 3, which has access to the global bulletin board 2, and an on-demand information service 4, which has access to the collection service 3.

In case the band mapping (product mapping) fails, for example if the SRWU type is not supported by the service provider because appropriate business products are not provided, the mediator component 7 is invoked to trade the SRWU outside the service providers domain, for example on the global grid 113.

The global bulletin board 2 gets current information from the collection service component 3, which dynamically collects statistical data about the managed processing domains. It also allows the PDs to set and update their global information such as prices. To get the required information, the collection service component 3 uses the on-demand information service 4, which is a low-level communication infrastructure service.

Figure 5:
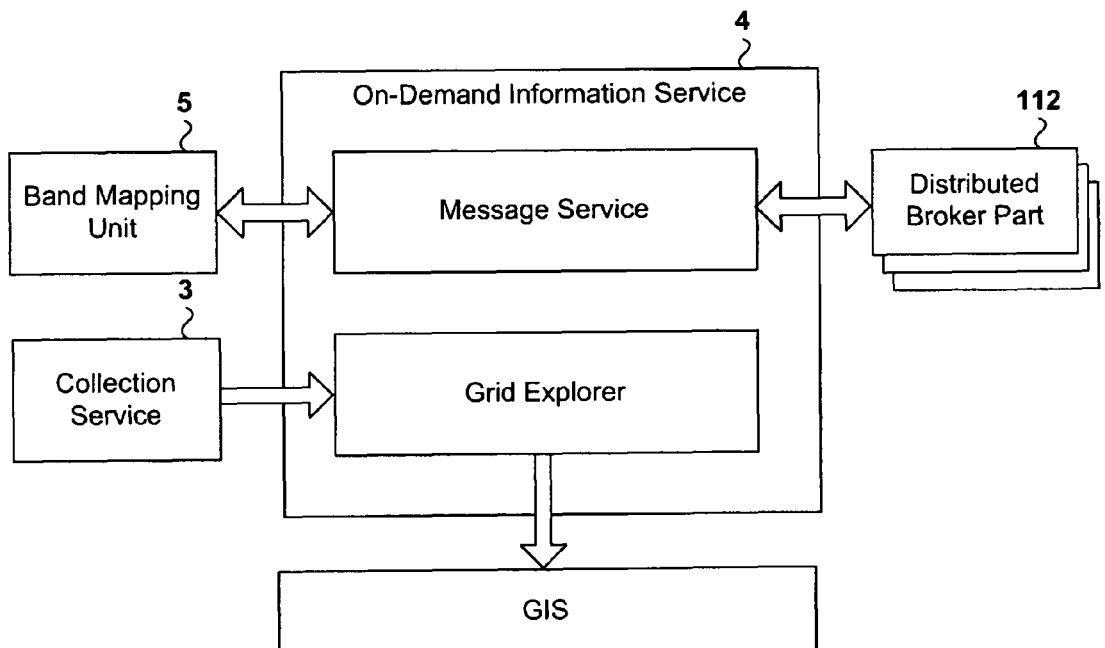
FIG. 5 shows the on-demand information service as part of the central grid service broker part.

The on-demand information service 4 explores the underlying grid infrastructure service (GIS) 114, which may be Globus GIS, Grid-Explorer, or the Grid-Service Broker Message service, to collect the data. As shown in FIG. 5, the on-demand information service has access to the band mapping unit 5, the collection service 3, the GIS 114, and the distributed broker parts 112.

Figure 6:
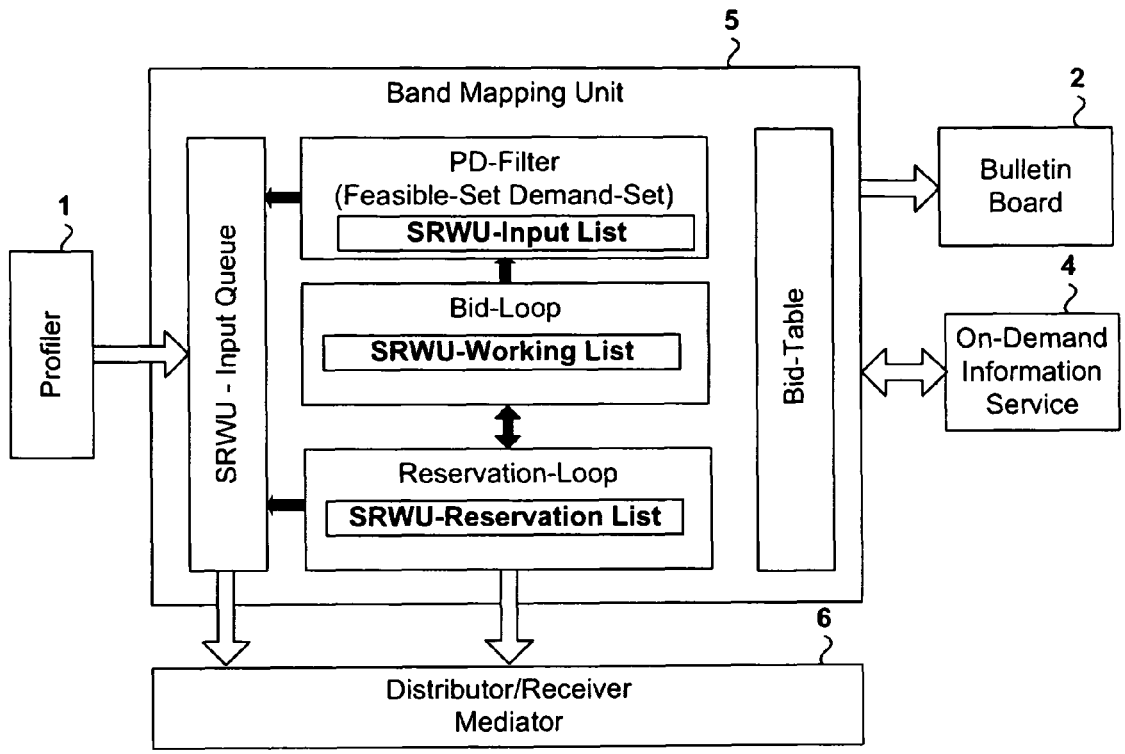
FIG. 6 shows a band mapping unit as part of the central grid service broker part.

Having validated and profiled the SRWU, the profiler component 1 hands over the request to the band mapping unit 5. As shown in FIG. 6, the band mapping unit 5 may include an SRWU input queue, a PD filter, a bid loop, a reservation loop, and a bid table. The band mapping unit 5 may have access to the profiler 1, the global bulletin board 2, the on-demand information service 4, and a distributor, receiver, mediator service 6.

The band mapping unit 5 provides global (service-provider level) optimization of the bands, trades SRWUs (service power) and establishes price, explores microeconomic mechanisms for trading (e.g., demand set, feasible set, or auction process), leads the auctions process such as a capacity sealed-bid auction to get offers for the PDs, builds proposal sets, and performs reservation to finalize the trade.

The communication process needed for SRWU scheduling (to the distributed service brokers 112, global grid 113, formatter 111, and profiler 1) is supported by the distributor, receiver, mediator service component 6, which encapsulates the underlying infrastructure.

Figure 7:
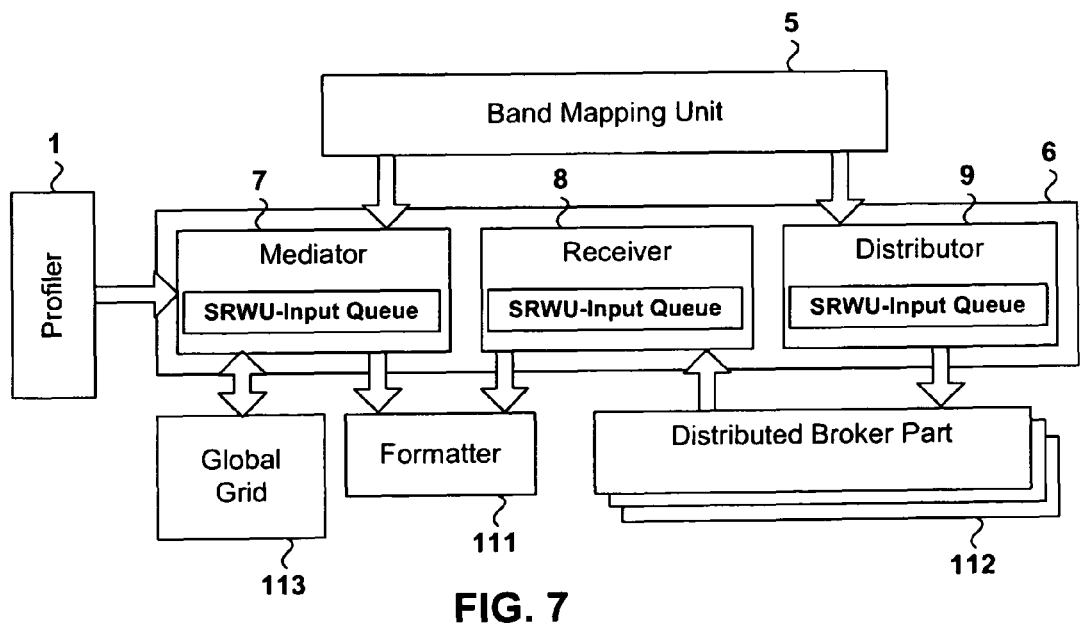
FIG. 7 shows a distributor, receiver, mediator service as part of the central grid service broker part.

As shown in FIG. 7, the mediator, receiver, distributor component 6 has mediator 7, receiver 8, and distributor 9 components, which may include a plurality of SRWU queues to handle the communication between the components internally, and may have access to the band mapping unit 5, the profiler 1, the formatter 111, the global grid 113, and the distributed brokers 112.

Figure 8:
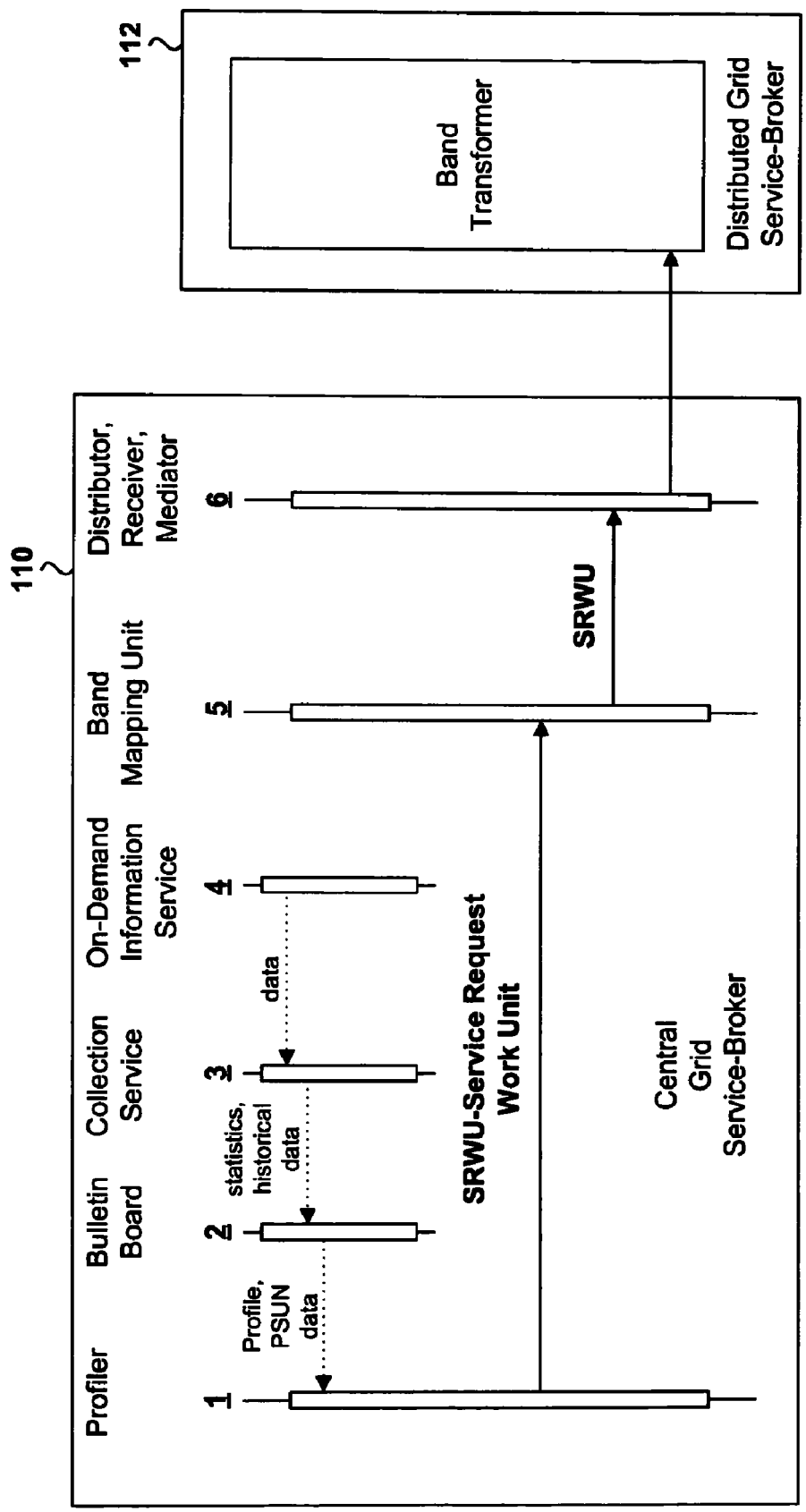
FIG. 8 shows an interaction diagram of the components in the central grid service broker part.

The flow between the components for the data collection, profiling, mapping, and scheduling of SRWUs in the central grid service broker 110 is described by interaction diagram FIG. 8. The on-demand information service 4 sends data to the collection service 3. The collection service 3 sends statistics and historical data to the global bulletin board 2. The global bulletin board 2 sends profiles and PSUN data to the profiler 1. The profiler 1 sends a service request work unit (SRWU) to the band mapping unit 5, which may alter the SRWUs and pass them to the distributor, receiver, mediator 6. The distributor, receiver, mediator 6 passes the SRWUs to the appropriate distributed grid service brokers 112.

Figure 9:
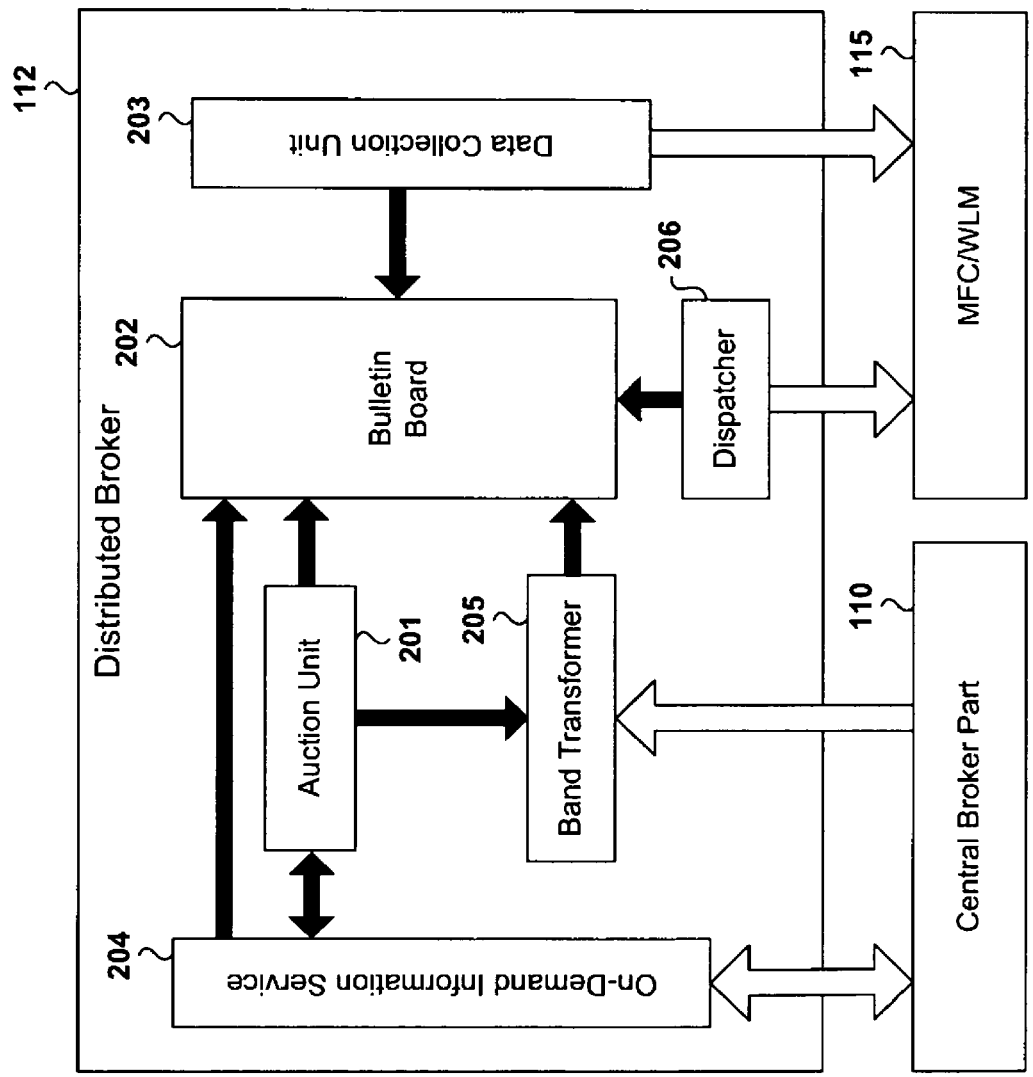
FIG. 9 shows the infrastructure of the inventive distributed grid service broker part.

The distributed grid service broker 112 with its major components is shown in FIG. 9. The distributed grid service broker 112 may include an auction unit 201, a local bulletin board 202, a data collection unit 203, an on-demand information service 204, a band transformer 205, and a dispatcher 206. The distributed broker 112 has access to the central broker 110 and a workload manager MFC/WLM 115.

Figure 10:
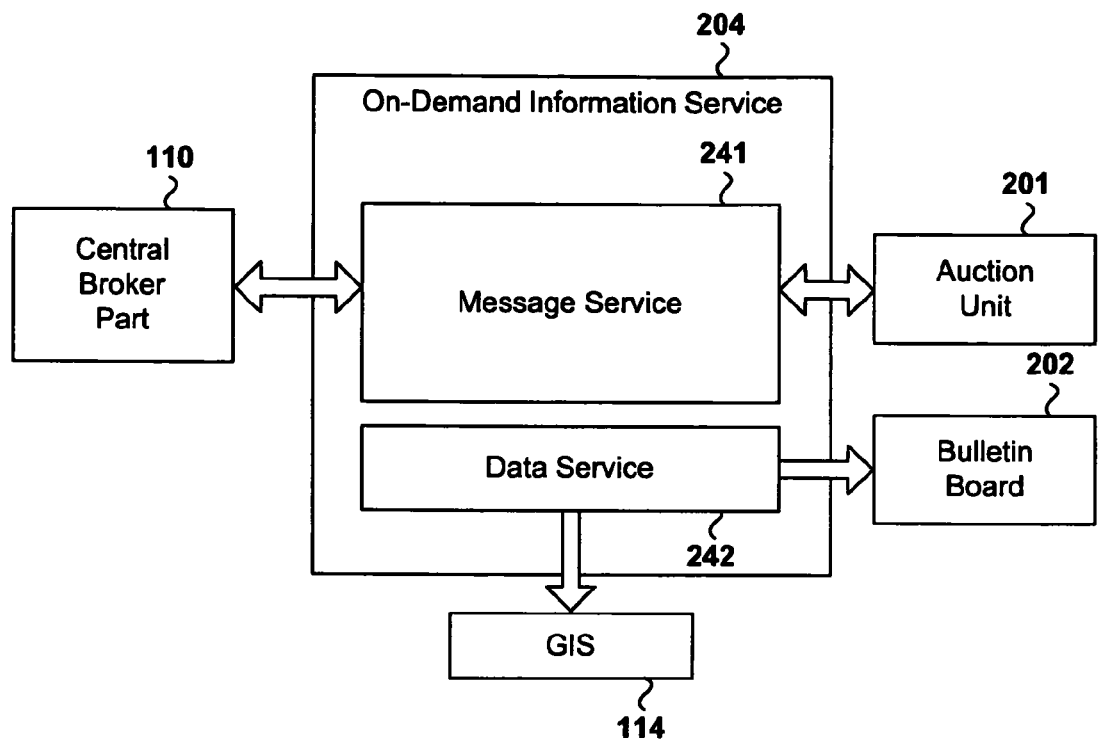
FIG. 10 shows the on-demand information service as part of the distributed grid service broker part.

The on-demand information service component 204 of the distributed grid service broker 112 is the counterpart to the on-demand information service component 4 of the central grid service broker 110, which component has been described with reference to FIG. 5. The on-demand information service component 204 of the distributed grid service broker 112 is responsible for the communication and the control process needed for auctions, data service, and central grid service broker recommendations such as optimization for band settings. FIG. 10 shows the structure of the on-demand information service 204, which includes a message service component 241 and a data service component 242. The on-demand information service 204 has access to the central broker 110, the GIS 114, the auction unit 201, and the local bulletin board 202.

When a bid-request to participate in an auction process is received, the auction unit 201 is triggered by the on-demand information service 204. The auction unit 201 is responsible for handling the auction process, which may be a capacity sealed-bid auction, with the central grid service broker 110, until the final reservation step. The auction unit 201 may use plug-in type mechanisms to perform the on-demand value calculation and to support different auction types. The auction unit 201 invokes the planning for SRWU processing to maintain the required QoS level and to smooth workload using an advanced reservation scheme.

Figure 11:
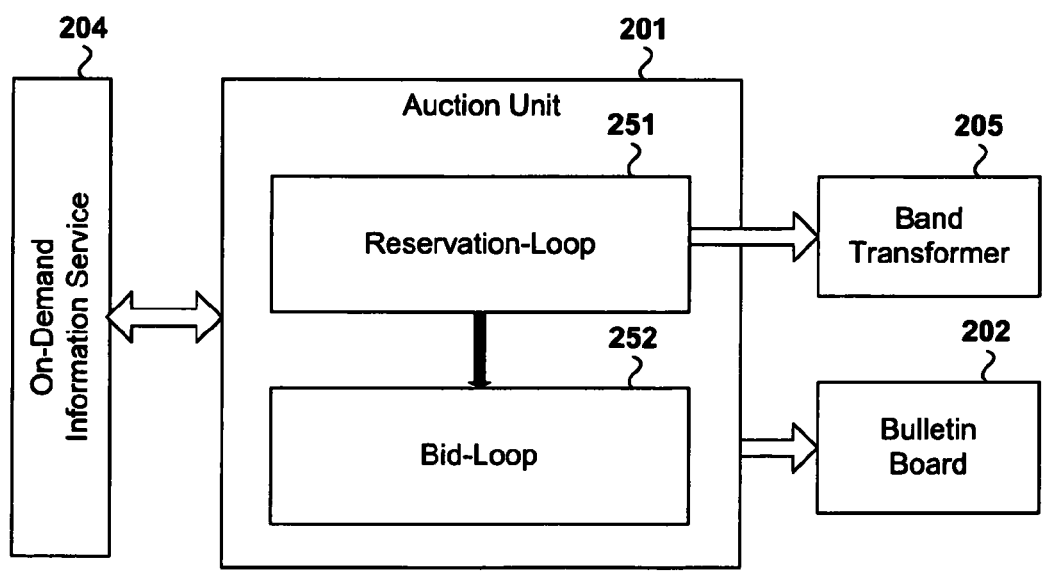
FIG. 11 shows an auction unit as part of the distributed grid service broker part.

The structure of the auction unit 201 is shown in FIG. 11. The auction unit 201 includes a reservation loop 251 and a bid loop 252, and has access to the on-demand information service 204, the band transformer 205, and the local bulletin board 202.

Figure 12:
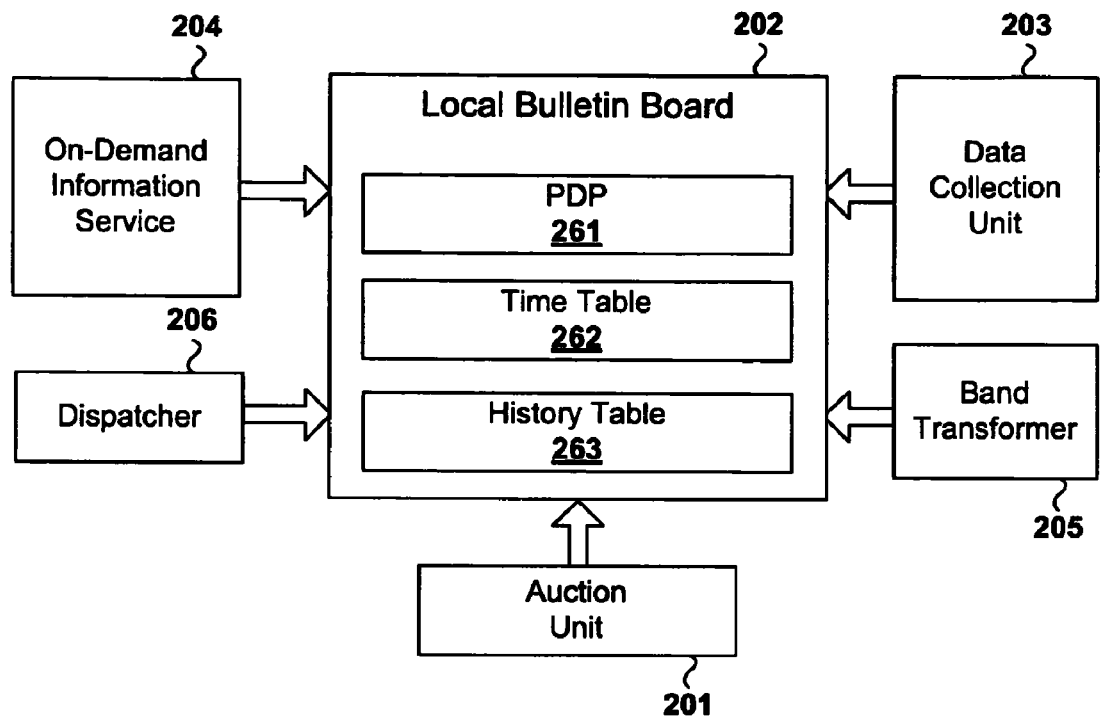
FIG. 12 shows a local bulletin board component as part of the distributed grid service broker part.

The distributed grid service broker 112 includes the local bulletin board 202, which may be used to maintain data utilized by the various components. The local bulletin board 202 contains profile, statistical, and historical data of the processing domain managed by its distributed broker. The structure of the local bulletin board 202 is shown in FIG. 12. The local bulletin board 202 includes a PDP table 261, a time table 262, and a history table 263. The local bulletin board 202 has access to the on-demand information service 204, the dispatcher 206, the data collection unit 203, the band transformer 205, and the auction unit 201.

Figure 13:
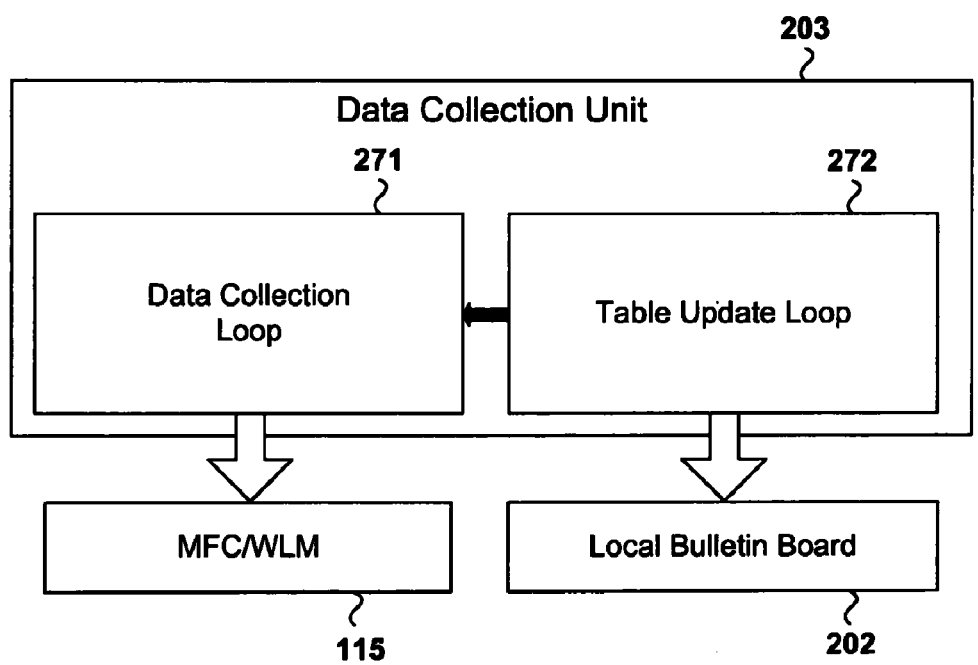
FIG. 13 shows a data collection unit as part of the distributed grid service broker part.

The data collection unit component 203 is responsible for periodically providing and updating statistical data to the local bulletin board 202, obtained through an interface with the work load managers (WLM) 115 or local resource managers, interfacing to local resource managers or work load managers 115. As shown in FIG. 13, the data collection unit 203 includes a data collection loop 271 and a table update loop 272, and has access to the MFC/WLM 115 and local bulletin board 202.

Figure 14:
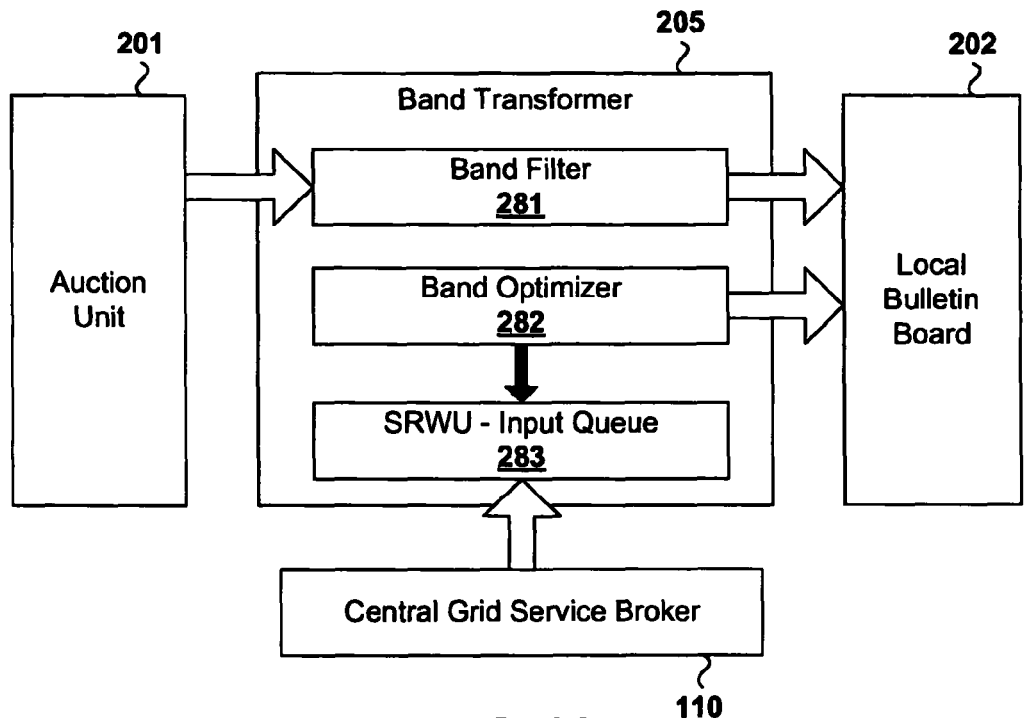
FIG. 14 shows a band transformer component as part of the distributed grid service broker part.
Figure 15:
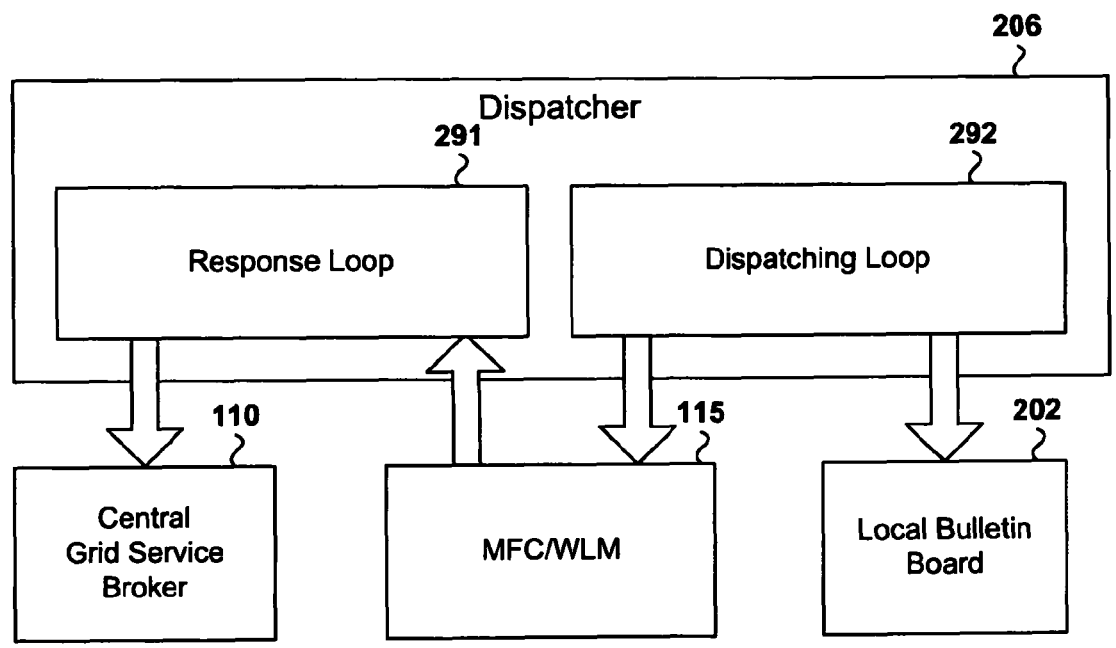
FIG. 15 shows a dispatcher component as part of the distributed grid service broker part.

The band transformer component 205 performs the dynamic adaptation of the individual bands to the demand. It gets recommendations from the central grid service broker 110, and is triggered by the auction unit 201. The band transformer component 205 utilizes information provided by the local bulletin board 202 such as arrival rates, win-loss rates, mean and equilibrium market prices, profit situations, and the like. The band transformer 205 may use a plug-in type mechanism to allow for different kind of filter algorithms, which may be static or dynamic. As shown in FIG. 14, the structure of the band transformer component 205 includes a band filter 281, a band optimizer 282, and an SWRU-input queue 283.

The band transformer component 205 has access to the auction unit 201, the local bulletin board 202, and the central grid service broker 110.

The band transformer 205 is coupled with the auction unit 201 to allow for immediate adaptation of the bands to the current demand and to provide a feedback loop for the supply of service power.

To allow for an optimal processing of SRWUs by resource managers which are dedicated to individual bands, the band transformer 205 sets the individual parameters required by local resource or work load managers 115 such as goal, class, priority, enclaves, velocity, and the like.

The dispatcher component 206 of the distributed grid service broker is responsible for dispatching SRWUs that are eligible for processing (status ready) as indicated by the reservation scheme time table. This is done within a periodic dispatch loop 292 (see FIG. 15). The SRWUs are dispatched to the local resource or workload manager 115 that explores their local interface. A response loop 291 receives results such as responses, messages, and the like, from the processing of the SRWU, which are forwarded to the receiver component of the mediator, receiver, distributor component 6 of the central grid service broker 110.

Figure 16:
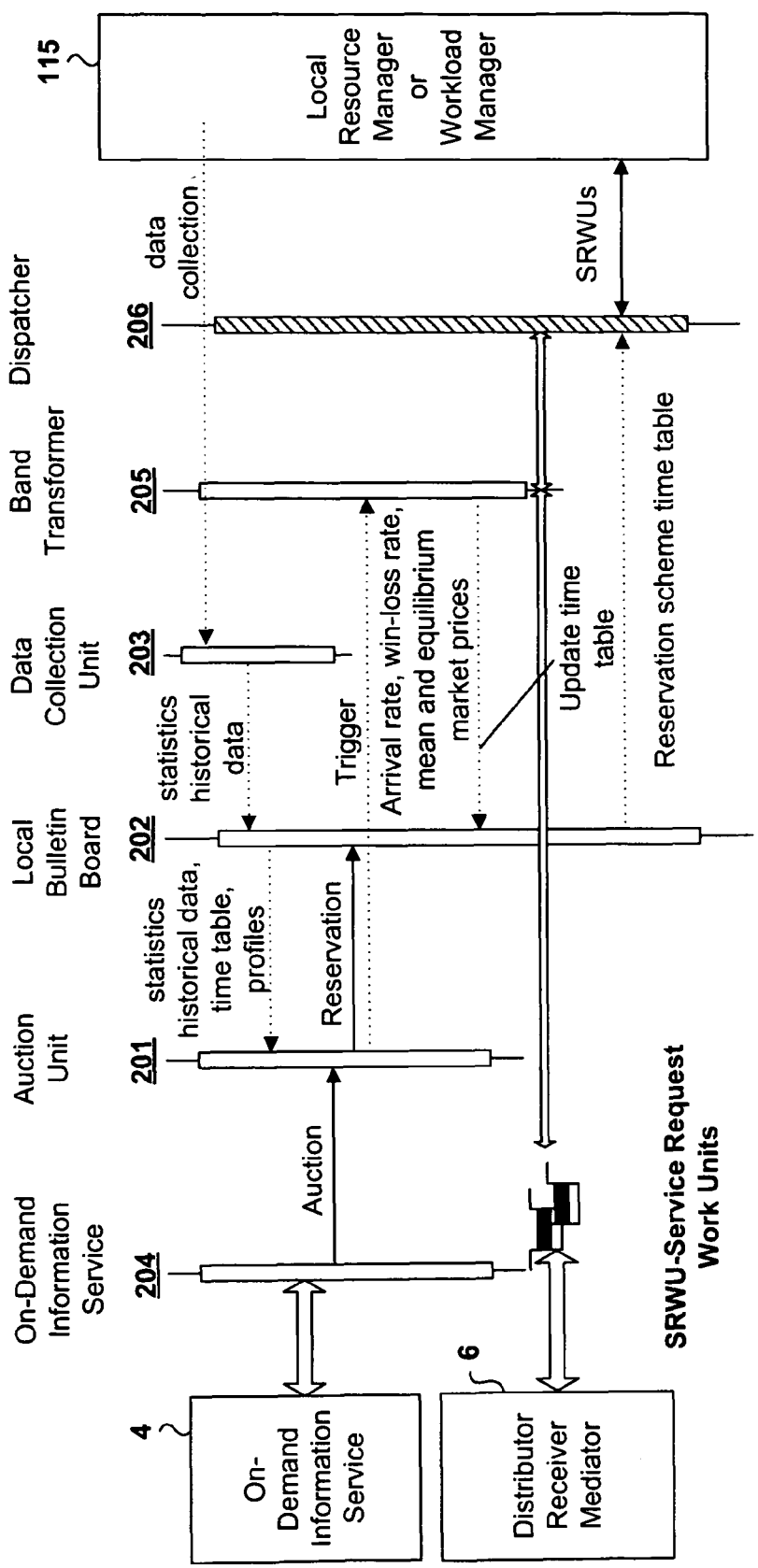
FIG. 16 shows a diagram of interactions between components of the distributed grid server broker part.

The flow between the components for the data collection, auctioning, reservation, and dispatching of SRWUs in the distributed grid service broker 112 is shown in the interaction diagram FIG. 16.

A preferred embodiment of the invention suitable for use in a local market environment is described now. The local market scenario shows the application of the grid service broker for service users having an individual over-the-counter (OTC) contract with the grid service provider. The service user is not free to choose other service providers. The contract may specify a particular level of quality of service or include a service level agreement (SLA). This is not a closed feedback loop to the service user in the sense of an economic market; the grid service broker works as a EOML3 scheduler.

Figure 17:
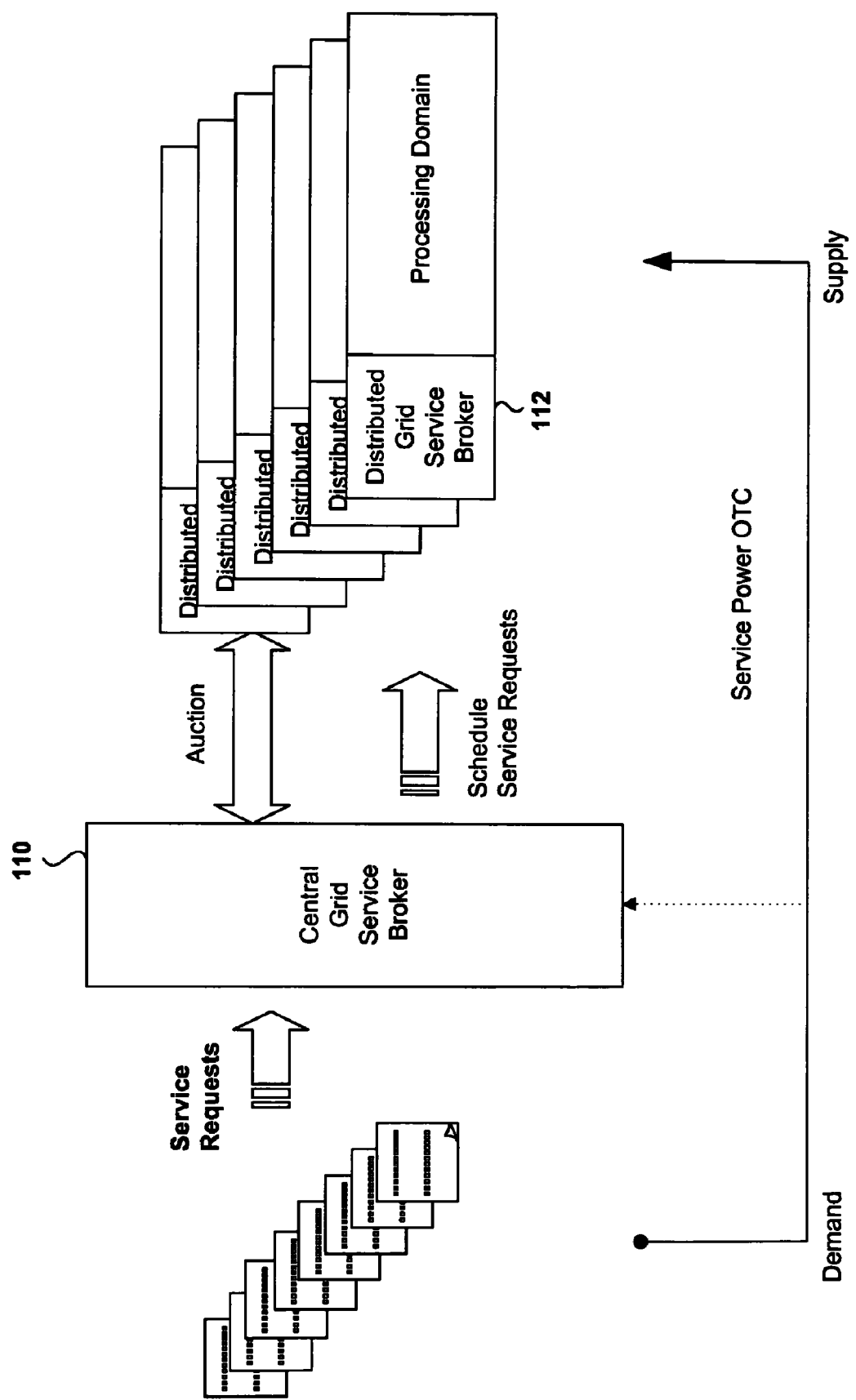
FIG. 17 shows an embodiment of the inventive grid service broker in a local market.

The major process flow of the central service broker and distributed service broker components is shown in FIG. 17. In the environment of this figure, closed user group service users send service requests that are distributed over time. The service users are bound by an OTC contract, and do not have free choice to select other service providers. The contracts include QoS provisions, and have SLAs for standardized products.

As shown in FIG. 17, the central grid service broker component 110 receives service requests from the service users 100 indicating the processing of computing services. These service requests could span single application services, business process services, and other types of computing services, including service-power reservations, provided by the grid service provider. The central grid service broker 110 analyzes the service requests, and maps them to a unique feasible set for individual business product types (bands). Based on the business product type, an auction process is started periodically by the central grid service broker 110 to all distributed grid service brokers counterparts 112 belonging to a demand set that is determined by the central grid service broker 110. The distributed grid service broker 112 calculates its on-demand value (ODV) for the processing of each business product type (band), and provides an offer containing the ODV price to the central grid service broker. If there is no service power available based on the actual reservation scheme, no offer will be provided.

The central grid service broker 110 evaluates the offers and builds a proposal set using its utility function, which may be, for example, a best price. Reservation requests are sent to all the distributed grid service brokers that are members of the proposal set.

The scheduling of the chosen service requests is done within the reservation loop 251 of the auction unit 201. Dispatching may be performed by the distributed grid service broker 112, using the reservation schemes time table 262 of the local bulletin board 202.

The central grid service broker 110 performs the following major tasks: monitors the profits of the distributed grid processing domains using a balanced score card; recommends increases and decreases of service power; filters service requests not matching; schedules service requests for processing; and implements the central part of the EOML3, including demand sets, feasible sets, utility functions, global optimizations, and so forth. All of these tasks have the objective of optimizing profit in a global or overall sense.

The distributed grid service broker 112 performs the following major tasks: dynamically adapts bands to the demand based on, for example, arrival rates, auction wins and losses, market trends, and global strategies; calculates on-demand values using the service providers product strategy and pricing models for service requests; implements the reservation scheme; dispatches service requests to the resource manager, and implements the distributed part of the EOML3, including supply, pricing function, local optimization, and so forth. All of these tasks have the objective of maximizing local profit.

Figure 18:
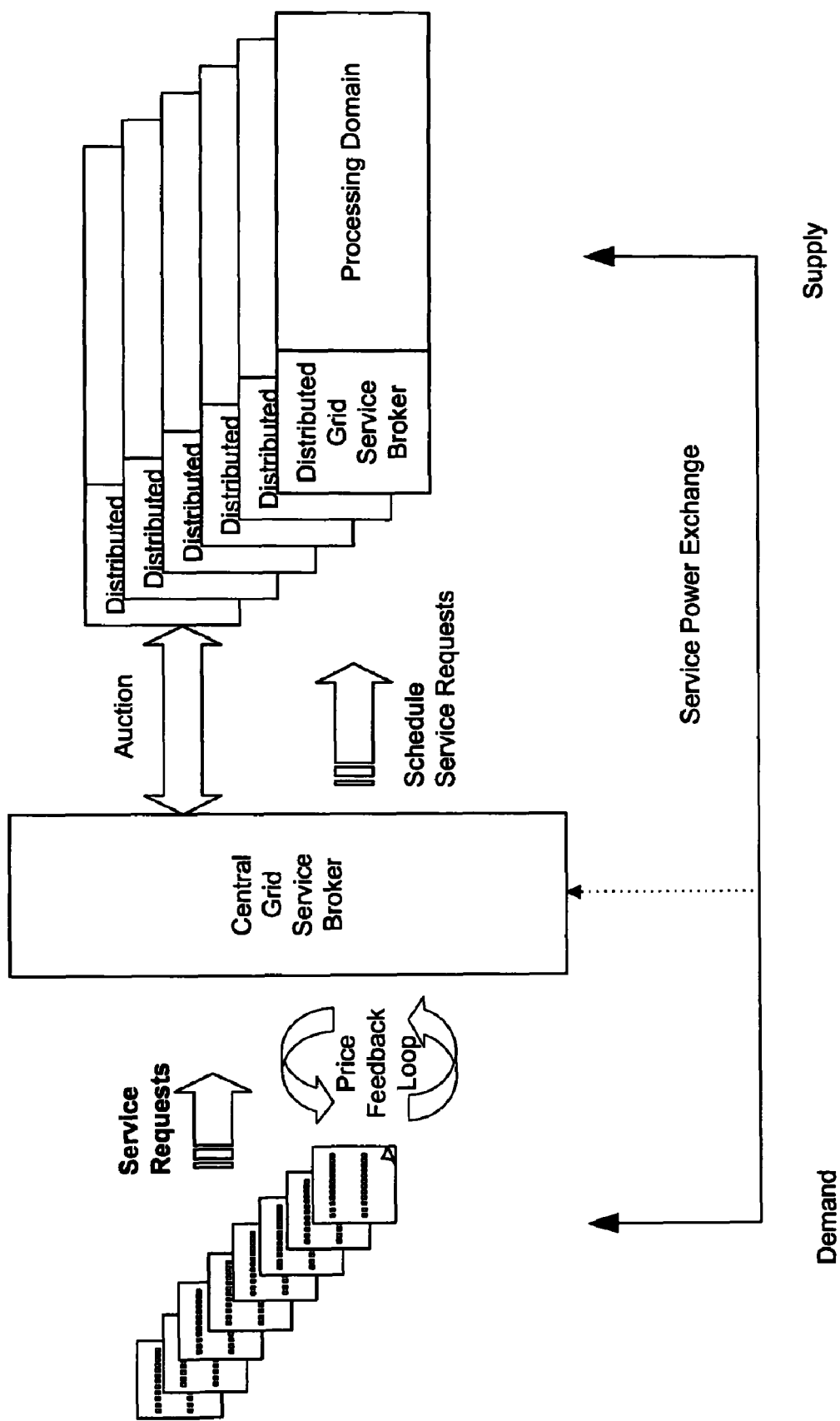
FIG. 18 shows an embodiment of the inventive grid service broker in a global market.

An embodiment of the invention suitable for use in a global market environment is now described in conjunction with FIG. 18. The grid service broker for global service users may have either individual OTC contracts or use standardized business products from the grid service provider. Here, the service users have free choice, and may select any service provider that seems to fulfill their needs. Quality of service agreements or service level agreements may be used in the contracts. This may be typical of a global grid scenario, and represents a closed feedback loop between the service users (demand) and the service providers (supply) in the sense of an economic market. The grid service broker works as an EOML3 scheduler with full service-brokerage functionality. A bulletin board which can be accessed or queried by service user may be provided to announce the actual listed prices.

The major process of the central grid service broker 110 is shown in FIG. 18. As shown in the figure, the central grid service broker receives service requests from global service users indicating the demand for computing services. These service requests may span single application services, business process services, and other types of computing services, including service-power reservation instruments like forwards, call options, swings, take-and-pay, and the like, provided by the grid service provider. An external bulletin board allows service users to query the actual market prices for the different computing services provided by the service provider.

The central grid service broker 110 analyzes the service requests and maps them to a unique feasible set for individual business product types (bands). Based on the business product type, an auction process is started periodically by the central grid service broker to all of the distributed grid service brokers counterparts that belong to a demand set that is determined by the central grid service broker. The distributed grid service broker calculates its on-demand value (ODV) for the processing each business product type (band), and provides an offer containing the ODV price to the central service broker component. If there is no service power available, based on the actual reservation scheme, no offer will be provided.

The central grid service broker evaluates the offers, and builds a reservation set using its utility function, which may be, for example, best price or a supply-demand matching function. Reservation requests are sent to all the distributed grid service brokers that are members of the reservation set. Scheduling of the service-requests may be done together with the reservation requests. Dispatching is performed by the distributed grid service broker, using the reservation scheme.

The central grid service broker 110 performs the following major tasks: monitoring the profits of the distributed grid processing domains using, for example, a balanced score card; monitoring capacity (demand and supply); calculating and announcing actual average and equilibrium market prices; recommending reports for distributed grid processing domains such as, for example, increased and decreased service power capacity; supporting instruments for service brokerage; filtering service requests not matching; scheduling service requests for processing; and implementing the central part of EOML3, including demand sets, feasible sets, utility functions, global optimization, and so forth.

The distributed grid service broker 112 performs the following major tasks: dynamically adapting bands to the demand based on, for example, arrival rates, auction wins and losses, market trends, global strategy, and the like; calculating an on-demand value using service provider product strategies and pricing models for service requests; implementing reservation schemes; dispatching service requests to the resource manager; and implementing the distributed part of EOML3, including supply, pricing functions, local optimization, and so forth.

Another embodiment of the invention, this having reservation functionality, is now described with reference to FIG. 19. This application scenario includes functionality of the grid service broker to handle service reservation requests which are separate from service requests intended for direct processing. A service reservation request is an option on a specific amount of service power in a given timeframe. Service reservation requests are not to be confused with service requests which have a timeline other than immediate processing, or with the reservation requests send by the central grid service broker during the auction process (reservation set) used to finalize the auction trade.

More or less, the service reservation requests are handled similarly to service-requests, but without carrying out the processing step. The scheduling of a corresponding service request will be delayed or will never occur.

Figure 19:
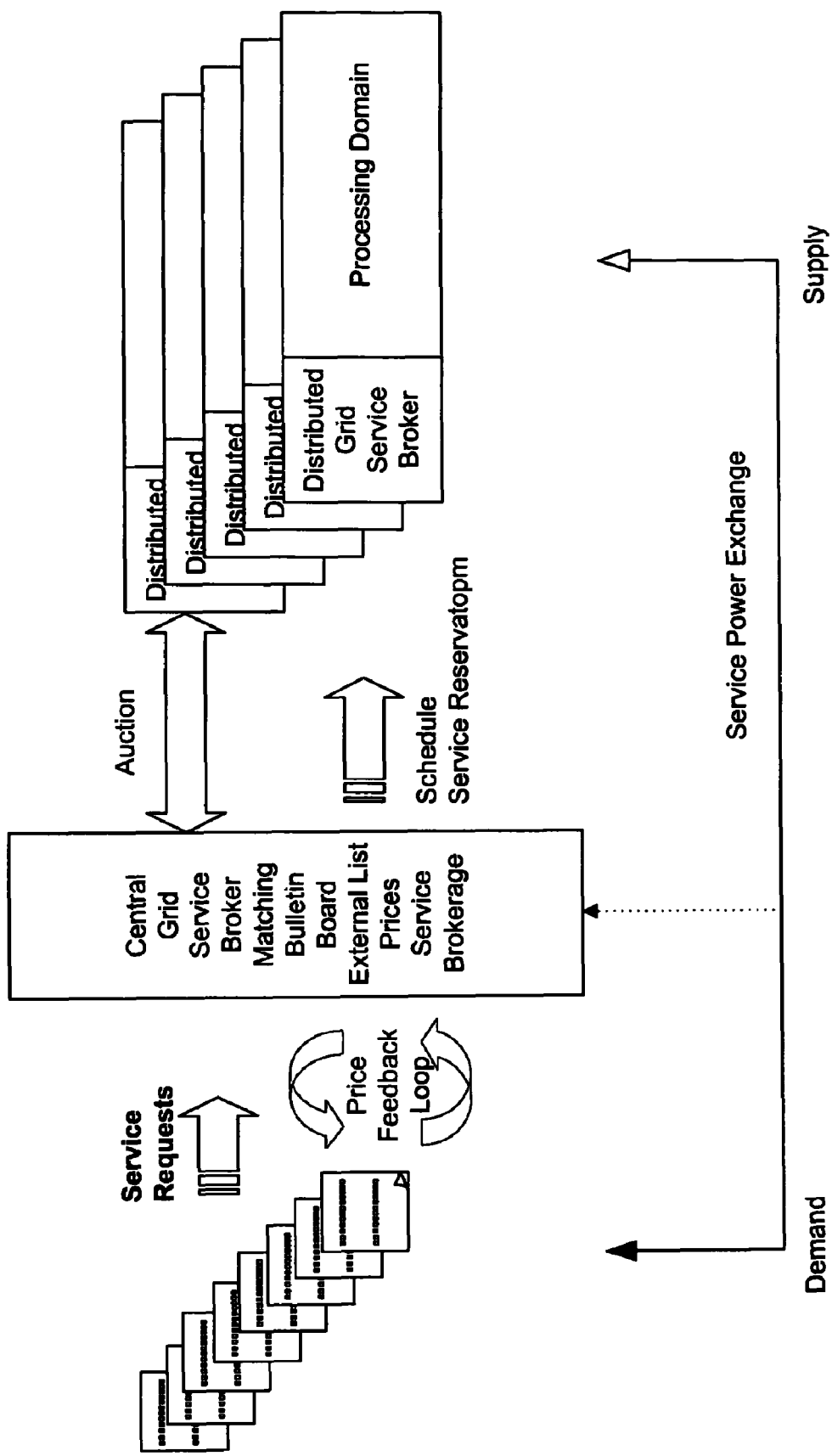
FIG. 19 shows an embodiment of the reservation process performed by the inventive grid service broker.

The major process flow of the central grid service broker component and the distributed grid service broker component is shown in FIG. 19. The central grid service broker component receives service reservation requests from global service users indicating an option to use a specific amount of service power in a given timeframe for a given service request. Due to the nature of a global market, the service users have free choice in selecting an appropriate service provider.

The service reservation requests are service-power reservation instruments like call options, swings, take-and-pay, and the like, offered by the grid service provider. An external bulletin board allows service users to query the actual market prices for the different options provided by the service provider. The central grid service broker analyzes the service reservation requests, and maps them to a unique feasible set for individual business product types (bands). Based on the business product type, an auction process is started periodically by the central grid service broker to all of the distributed grid service brokers counterparts that belong to a demand set that is determined by the central grid service broker. The distributed grid service broker calculates its on-demand value (ODV) for the processing of each product type (band), and provides an offer containing the ODV price to the central grid service broker component. If there is no service power available, based on the actual reservation scheme, no offer will be provided.

The central grid service broker 110 evaluates the offers and builds a reservation set using its utility function, which may be, for example, best price or a supply-demand matching function. Reservation requests are sent to all the distributed grid service brokers that are members of the reservation set.

A service user can then send a service request taking the accepted service reservation request option. This needs to take place before the option expires. The service request will be scheduled at the time of the option maturity.

In this embodiment, the central grid service broker 110 and the distributed grid service broker 112 perform the same tasks as described above with reference to FIG. 18.

Figure 20:
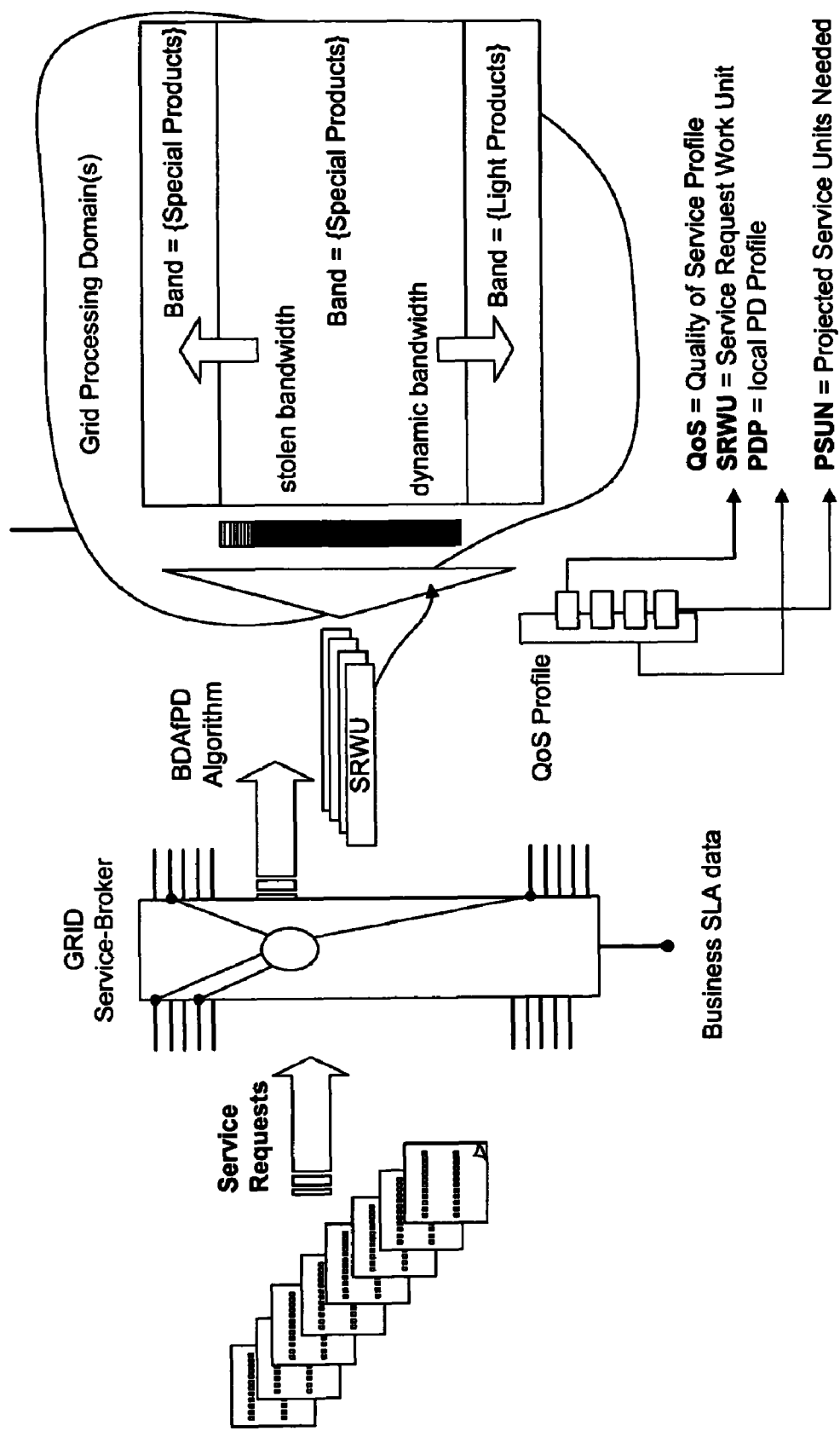
FIG. 20 shows an embodiment of the inventive grid service broker using a meta scheduler.

Another embodiment of the invention, this with a novel meta-scheduler functionality, is now described with reference to FIGS. 20-21. The meta-scheduling type of distribution mechanism uses an economic optimization model scheduling policy (EOML3) for the distribution of service requests to service provider grid domains. The meta-scheduler works with the abstraction of computing resources to the level of service power as a commodity measured in basic service units. A service provider can use commercially oriented quantifiable criteria for specifying an optimization strategy.

The meta-scheduler uses the concept of bands, which represent the business product related capacity of service power, to optimize the processing of different service request types. The algorithm used to dynamically manage these bands is called the band distribution algorithm for processing domains (BDAFPD). FIG. 20 shows the principles of BDAFPD and the major functional elements involved. The concept of bands allows correlating service requests directly with business products, business processes, and the like, offered by a service provider. The following advantage can be realized using the meta-scheduler with BDAFPD for processing service requests compared to the traditional approaches.

Dynamic band management can be used to adapt the service-power (band capacity) on-demand to the service requests to reach a supply-demand equilibrium. The service provider can save costs for spare capacity not needed. The free capacity can then be used, for example, to process non-grid related business.

Using the meta-scheduler with BDAFPD maximizes the profit (throughput) for business products (service requests) by simply increasing the bandwidth for these products in the processing domain. This can be based on periodically performed profit evaluations, which result in recommendations, done by the grid service broker.

Bands showing low profit in relation to others can be decreased in capacity or closed dynamically; this is true also on the processing domain or service provider level. It allows optimization of the product and processing domain portfolio according to the market demand.

The dynamic utilization of the cost function in relation to service power needed for service requests can be used to define a large bandwidth or one single band for service requests. This enables optimization of processing on processing domain levels having different cost/processing structures for service requests.

Using the meta-scheduler with BDAFPD allows for fast rejection of service requests before accepting them, using a filter and demand-set, if the service provider processing domains do not have the capabilities needed to process the service requests, instead of scheduling a service request and paying a business penalty if service level agreements are violated or processing cannot be executed.

Bands carry the attributes of the QoS committed by the service providers to process specific service requests types. This allows for the use of band-specific resource managers which are optimized for processing specific service requests, which allows for a higher degree of QoS guarantee with fewer penalty payments, and a higher utilization of service requests, providing higher profit for the band.

Figure 21:
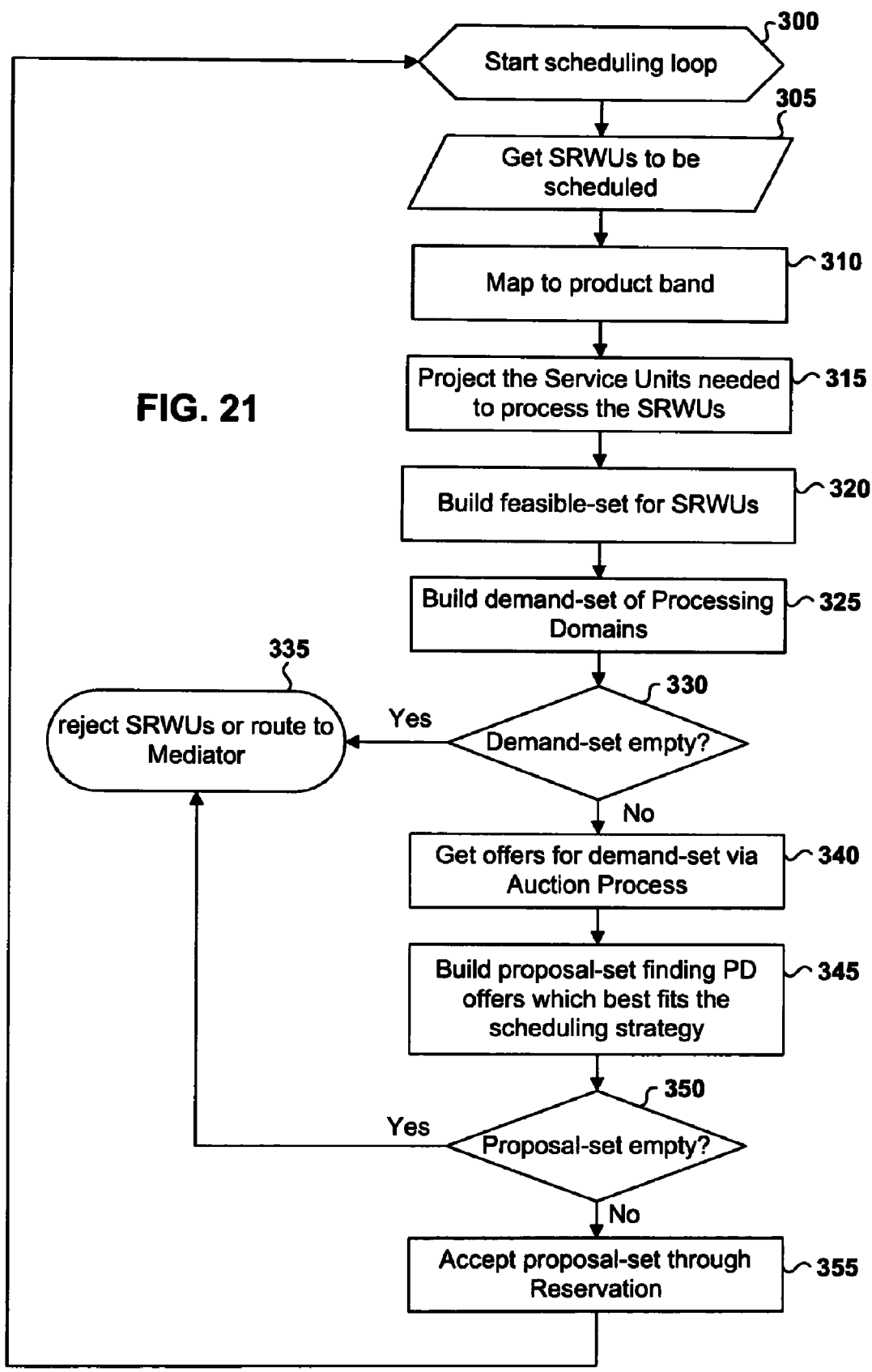
FIG. 21 shows the basic flow of FIG. 20.

The meta-scheduling service of the grid service broker in conjunction with the dynamic band management and BDAFPD algorithm provides a general framework to allow for the optimization of the service providers profit generated with the processing of service requests, as shown in FIG. 21. It allows for many types of multi-objective optimization algorithms based on individual plug-ins for dynamic band management, on-demand value calculation, filter functions, demand sets and feasible sets generation. The grid service broker dynamically collects hierarchical data about current profit, prices, capacity, performance Index, QoS, supply, demand, elapsed time and other statistical information for individual bands, processing domains, and services providers to support these algorithms.

As shown in FIG. 21, the scheduling loop is started (block 300) for every period, and the SRWUs to be scheduled are fetched (block 305). The product band is found by mapping the service request unit type to a specific band (block 310). The service units needed to process the SRWUs are then projected (block 315), using accumulated historical data based on SRWU type (PSUN). A feasible set is then built for the SRWUs (block 320), based on SRWU type, PSUN, and filter criteria, and a demand set of processing domains in built (block 325) that fulfils the SRWU requirements (CSE) within the processing domain profiles (PDP). A determination is made as to whether the demand set is empty (block 330). If the demand set is empty, the SRWU is rejected or routed to the grid service broker mediator (block 335). Otherwise (i.e., the demand set is not empty), offers for the demand set are obtained by the auction process (block 340). For example, a capacity sealed bid auction may be started for the remaining service capacity in the product bands used to process the SRWUs (the feasibility set). The proposal set is then built (block 345) which best fits the scheduling strategy. For example, best price or lowest performance index may be used to schedule the SRWUs. A determination is made as to whether the proposal set is empty (block 350). If the proposal set is empty, no capacity is available, and the SRWU is rejected or routed to the grid service broker mediator (block 335). Otherwise (i.e., the proposal set is not empty), the proposal set is accepted (block 355), and the process returns to the beginning of the scheduling loop (block 300).

Another embodiment of the invention, this with abstraction and transformation functionality, is now described. The abstraction of computing resources to the level of service power is used by the grid service broker on a granular basis. The service power provided by grid processing domains is measured in elementary service units, which are also the basic accounting units for service power used in a processing domain.

To calculate the total service power, basic resource units are used which could be, for example CPU units, I/O units, main storage units, application units, OS units, network units, or the like.

These basic resource units are multiplied by individual weights reflecting their relevance to others such as cost factors. A calculation of the service power used to process a service request work unit SRWU t in a period timeframe of P on a processing domain $PD^x$ having n basic resources can be formulated as:

$$S_t^x = \vec{B}_t^x \times \vec{\delta}^x = \sum_{i=1}^{n} \sum_{j=1}^{P} B_{t,j}^x \cdot \delta^x [SU]$$

To transform the service power between different processing domains which have different processing performance, a service unit transformation factor can be defined and used to calculate neutral service units for $PD^x$ as follows:

$$\gamma_{SU}^x = \frac{1}{PD_{coeff}^x}$$

The transformation factor can be derived using a reference processing domain and having the basic resource weights given for the processing domains.

Another practical approach for getting the transformation factor is to use a PD benchmark as follows:

$$PD_{benchmarkM}^{x=ref} = \sum_{t=1}^{m} S_t^x \leftrightarrow SRWU_t \forall (SRWU_t \in M)$$

which is calculated as the mean value of historical samples m needed to process benchmark M on reference PD M=unconstrained mix, resulting in a PD coefficient of $$PD_{coeff}^x = \frac{PD_{benchmarkM}^x}{PD_{benchmarkM}^{ref}}$$

The initial estimation of the PD processing power may be used if a combination of heterogeneous PDs are given, and the measurement of basic resource units is done using different methods. This means that the local resource managers or work load managers of the processing domains use different methods to sample the basic resource units. In a homogenous environment, this can be avoided by using a global sampling metering.

At least two different approaches can be used to calculate the neutral service units required by the grid service broker, which are an initial benchmarking of the PDs using a reference PD to calculate the PD coefficient or using comparable performance data for the basic resource units of the PD to calculate the PD coefficient.

Another embodiment of the invention includes reservation scheme functionality. The distributed grid service brokers use an advanced reservation scheme to plan the processing. The scheme allows for the planning of service requests and service reservation requests. A basic reservation unit is called reservation slot, and represents a fixed or variable capacity of service power in a single period of time.

Using this reservation scheme, the distributed grid service brokers optimize the processing according to QoS parameters such as, for example, timeline or elapsed time, and t optimize profit by smoothing the peak load demands over periods of time. This is may also be based on historical time series analysis using, for example, performance index data or profit data collected by the data collection service over time and evaluated by the data historical simulation service.

Another embodiment of the invention includes data collection service. The data collection service is an additional component of the distributed grid service broke, which extends the basic components. It provides compression and data sampling techniques for reducing the amount of collected data resulting in pre-analyzed cleared time series.

Another embodiment of the invention includes data historical simulation service. Data historical simulation service is an additional component of the central grid service broker which extends the basic components. It provides enhanced data analysis techniques for historical data to support projection and risk analysis for the SRWU processing.

Another embodiment of the invention, this with an on-demand value function, is now described. The on-demand value function (ODVF), which is used by the distributed grid service broker, determines the actual market value or on-demand value (ODV) for service-request processing. The function represents a multi-objective optimization scheme, based on demand, supply, revenue, cost, penalty, and time frame, as shown below in the expression defining r.

Individual elements (which are themselves functions) of the ODVF are the functions for demand, supply, price (revenue), cost, and penalty. The ODV is calculated during the auction process for service requests on a given time horizon (timeline parameter). Depending on the calculated ODV, individual service requests can be ranked and selected during the auction process (with an offer response) by the distributed grid service broker based on, for example, local profit optimization. The same mechanism takes place if service power (capacity) is requested on an individual band level in a capacity sealed bid auction. In this case, the ODV is calculated for band capacity on a given time horizon. It can be used, for example, to adjust the band settings, wherein, for example, a higher ODV leads to extend the band capacity if needed.

$$\Gamma(SO_i^x) = M\{ SO_{B_i}^x, U(PD^x), SO_{R_i}^x, C(PD^x), \Omega(T_p) \}|_{Period=P}$$

Demand
Supply
Revenue
Cost
Penalty
Time frame

An example of an ODVF with the function elements price P, costs K, and penalty can be formulated as follows:

$$\Gamma(SO_i^x) = \Xi^x - \Pi^x - \Omega^x = P(SRWU_i)^x - K(SRWU_i)^x - \Omega(SRWU_i)^x$$

Supply and demand is expressed using the performance index, which may be calculated as:

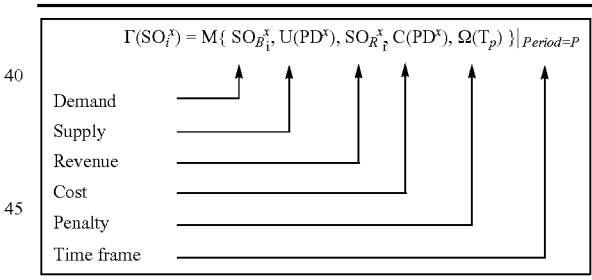

$$PI^x = \frac{demand^x}{max. \; Supply} = \frac{\sum_i SPDB_i^x}{TSUP^x}$$

i = number of bands

The price or revenue function for SRWU i can be formulated based on an actual performance index PI of the processing domain x in a time interval [t,T]:

$$P(SRWU_i)^x = \frac{PDCost}{TSUP^x}\Box(1 + PI_t^x + \Delta \hat{P} I_T^x) \cdot$$
$$PSUN_i^x \Box (1 - \text{discount} \Box \text{discount\_correction})$$

... without reservation costs and $PI_{Spot}{}^x = PI_t{}^x$

The discount correction is a function of the PI, which could be as follows:

$$\text{discount\_correction} = 1 - \frac{1 - PI^x}{1 + PI^x}$$

The PI delta can be estimated using time series analysis on historical data and forward calculation using, for example, a mean-reverting model, where the delta may be calculated as actual spot PI minus the mean value of the forward PI for interval T.

$$\Delta \hat{P} I_T^x = PI_S^x - \overline{F}(PI_T^x)$$
$$= PI_S^x - \frac{1}{T}\sum_{i=0}^{T} F(PI_i^x)$$

Sample Period = $N$;
$PI_0^x$ = timeseries start;
$T = n$ periods

An alternate approach could be to use the mean value of a forward-call-options calculation with financial instruments based on, for example, the technique of Black and Scholes for valuing options:

$$\Delta \hat{P} I_T^x = \frac{\sum_{i=1}^{T} PI_{ci}^x}{T}$$
$$= F_C(H(PI^x), T_P)$$

Sample Period = $N$;
$PI_0^x$ = timeseries start;
$T = n$ periods

The cost function may be calculated using a linear approach according to the projected service units needed (PSUN) for the processing of SRWU type I:

$$K(SRWU_i)^x = \frac{PDCost}{TSUP^x} \cdot PSUN_i^x$$

The penalty function relates directly to the quality of service function and the probability of failure. The final penalty cost calculation is shown below:

$$\Omega^x = (1 - p(\Omega)) \cdot \xi_\Omega p(\Omega) = f(PI^x)\Omega(SRWU_i)^x = \Omega^x \cdot P(SRWU_i)^x$$

The probability of failure may be a simple function such as:

$$p(\Omega) = 1 - PI^{x2}$$

or a more complex function such as:

$$p(\Omega)_{n+1} = p(\Omega)_n + PI_x \cdot p(\Omega)_n \cdot (p(\Omega)_{Limit} - p(\Omega)_n)$$

$$p(\Omega)_1 = 1.0; \; p(\Omega)_{Limit} = L < p(\Omega)_1; \; \Delta PI = PI\_\text{increment}$$

If no continuous form can be derived, data from time series samples based on historical values can also be used.

Many more ways to derive and express the ODVF are possible. For example, a micro economic approach using a tatonement process with excess functions may be used.

Figure 22:
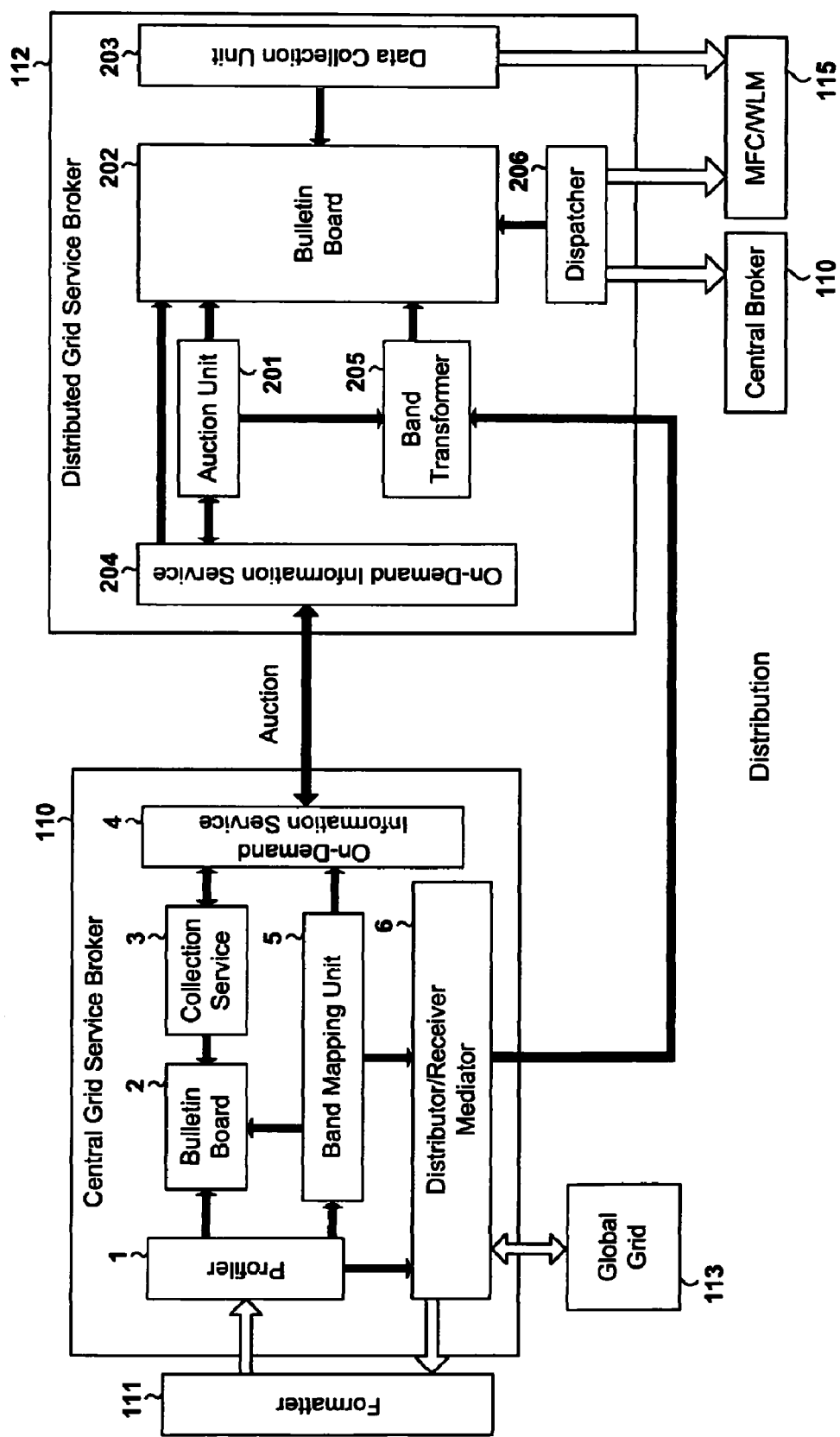
FIG. 22 shows the novel auction process between the central grid service broker part and the distributed grid service broker part.
Figure 23:
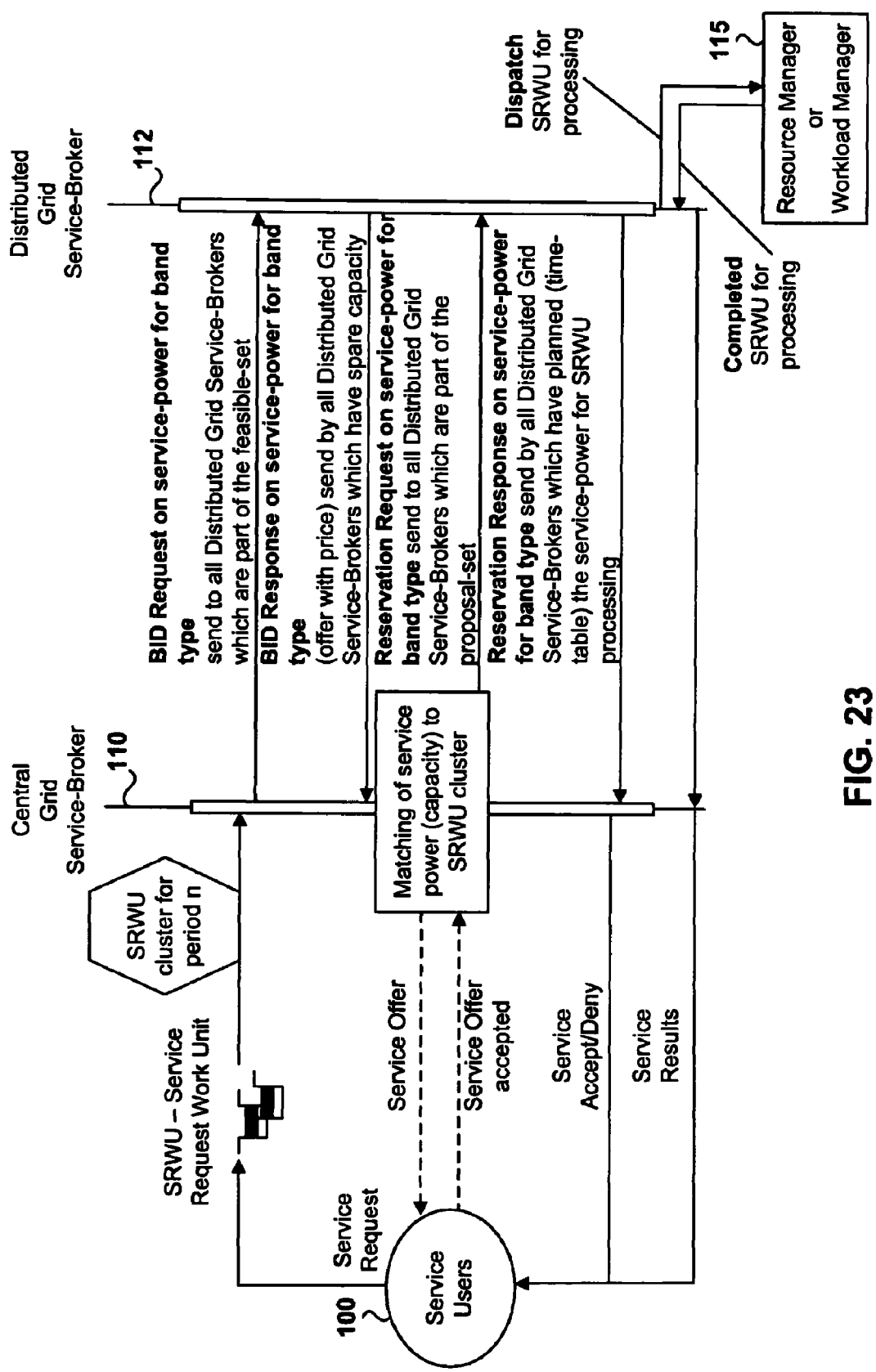
FIG. 23 shows a preferred embodiment of communication flow of the novel auction process as shown in FIG. 22.

Another embodiment of the invention, this having a capacity sealed bid auction, is now described in conjunction with FIGS. 22-23.

The grid service broker uses a novel type of auction to optimize the communication between the central grid service broker and the distributed grid service brokers. The auction mechanism is called here a capacity sealed bid auction. The general picture of scheduling SRWUs to appropriate processing domains is shown in FIG. 22. This is a two step approach with an auction mechanism as a first step followed by the distribution of SRWUs as the second step.

Using a standard auction mechanism such as a standard sealed bid auction would lead to the execution of the two steps mentioned above for each SRWU arriving in the SRWU queue. Special care needs to be taken in this approach to allow auction retries for SRWUs not served by PDs in the first auction run (otherwise leading to a high rejection rate of SRWUs, even if PD service power is available). For the standard auction case, these involve all SRWUs which lost the auction to the winner SRWUs not getting an offer from the PDs. This leads also to a low utilization of PDs due to bidding congestion for the same attractive SRWUs, and then having spare capacity for the auction period if the auction is lost.

FIG. 23 illustrates a novel and sophisticated auction mechanism that reduces the communication overhead between the central grid service broker and the distributed grid service broker and to get an acceptable profit for the PDs. This mechanism reduces the rejection rate of SRWUs if capacity is available, allows for auction retries, and reduces spare capacity of PDs, thereby leading to higher profit. The novel solution is called here a capacity sealed bid auction.

As shown in FIG. 23, the central grid service broker clusters SRWUs for each scheduler period by their individual type. The capacity is calculated for the total service power needed to process all SRWUs which map to a specific band type using the BDAFPD described earlier. An auction process with the distributed grid service brokers is started to get the required service power (on band level). The central grid service broker analyses the BID responses (offers) from the distributed grid service brokers, and matches the offered capacity to the required capacity on the SRWU level using, for example, a best price policy. SRWUs that could not be matched because service power is not available are allowed to join the next auction run until a final retry is reached.

The inventive approach leads to an overall reduction of communication overhead between the two broker parts by a factor of seven compared with the standard solution. The profit of the PDs is increased for the same experiment by fifty-percent more utilization. These experiments also show that a retry count of one is sufficient in the capacity sealed bid auction to avoid starvation of single SRWUs compared to a retry count of more than ten in the standard case.

Another embodiment of the invention includes service brokerage. Service brokerage is an additional component of the central and distributed grid service brokers which extends the basic components of standard instruments. It provides enhanced functionality for service trading based on financial instruments tailored to trade computing service power. Instruments supported include forward and option pricing such as swing options, take-and-pay options, capacity options, and the like, which need to be priced for future processing, spanning 1 to n periods of elapse time, and having different QoS requirements.

Another embodiment of the invention includes service request processing using a master flow controller. The master flow controller is an additional component of the distributed grid service broker, which extends the basic components. It provides a sophisticated mechanism for scheduling and controlling business process related applications based on a common business process description language. It extends the local resource managers's functions to the level of a business process controller by the master flow controller component. This component is responsible for processing, controlling, and monitoring a SRWU related business process.

The present invention may be implemented in the grid architecture known as Globus, as described below. First, the major components of the Globus architecture are briefly described, and then the inventive extensions needed to implement the present invention in the Globus environment.

Figure 24:
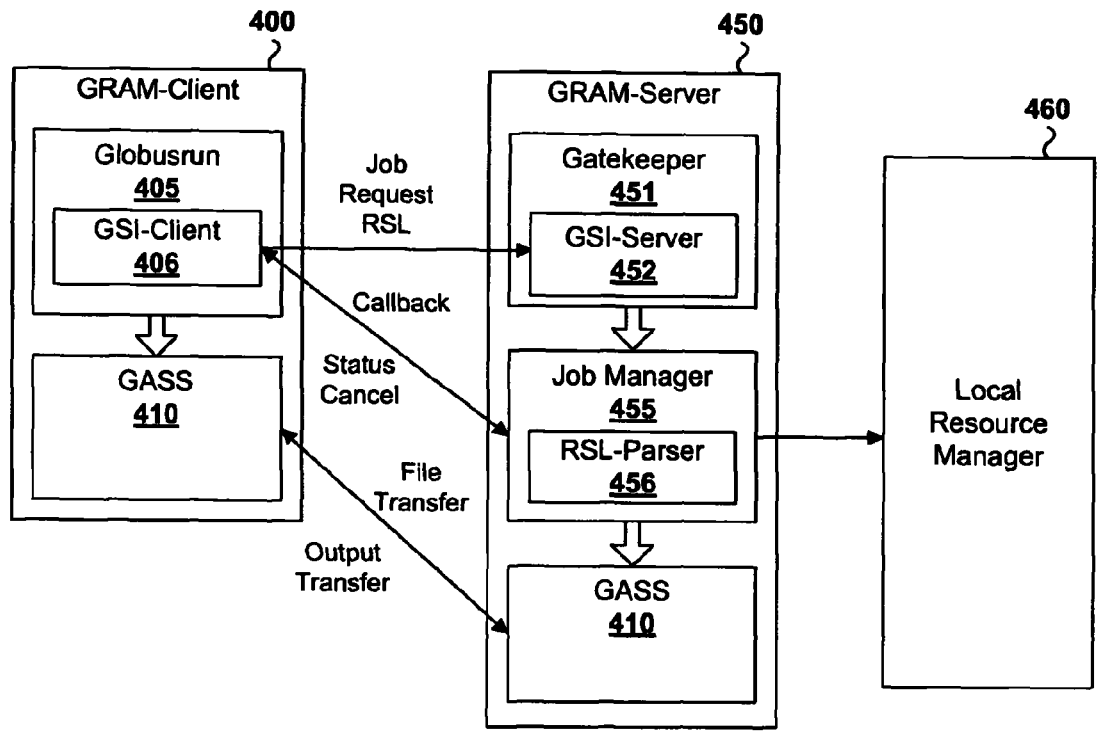
FIGS. 24-26 show the Globus grid architecture according to the prior art.

The major components of Globus are shown in FIG. 24. These components are the grid resource allocation manager (GRAM) client 400 and server 450. Communication between client 400 and server 450 takes place using Globus Resource Specification Language (RSL) scripts. These scripts contain jobs and their corresponding execution parameters. The job manager component 455 of the GRAM server 450 interfaces to the local resource managers 460 to dispatch the jobs scheduled by the GRAM client 400. The job manager 455 includes an RSL parser 456. The GRAM client 400 receives status information about the actual job execution, and receives the final outputs via a global access to a secondary storage (GASS) component 410. The GRAM client 400 also includes globusrun 406, which further includes a GSI client 406. The GRAM server 450 includes a gatekeeper 451, which further includes a GSI server 452.

Figure 25:
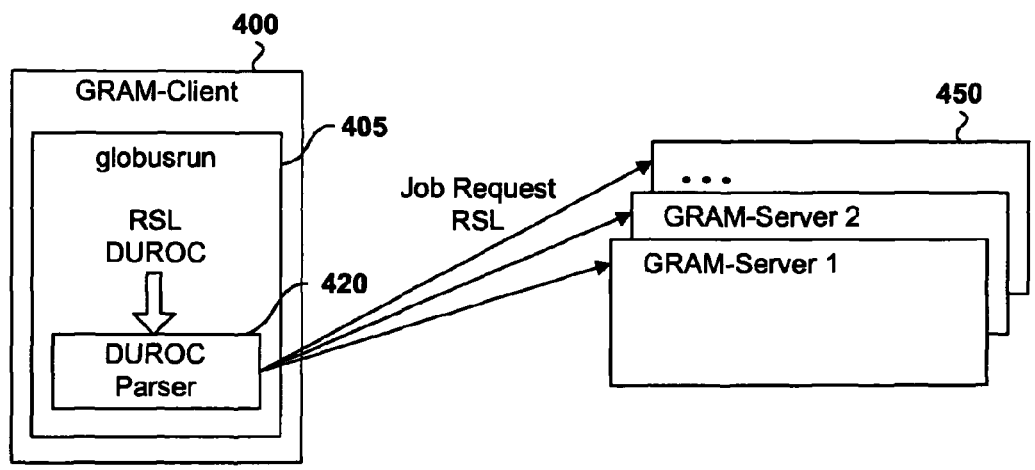

As shown in FIG. 25, a dynamically updated request online coallocator (DUROC) parser 420 is included in the globusrun 405 of the GRAM client 400 to allow for distribution of incoming jobs to different GRAM servers.

Figure 26:
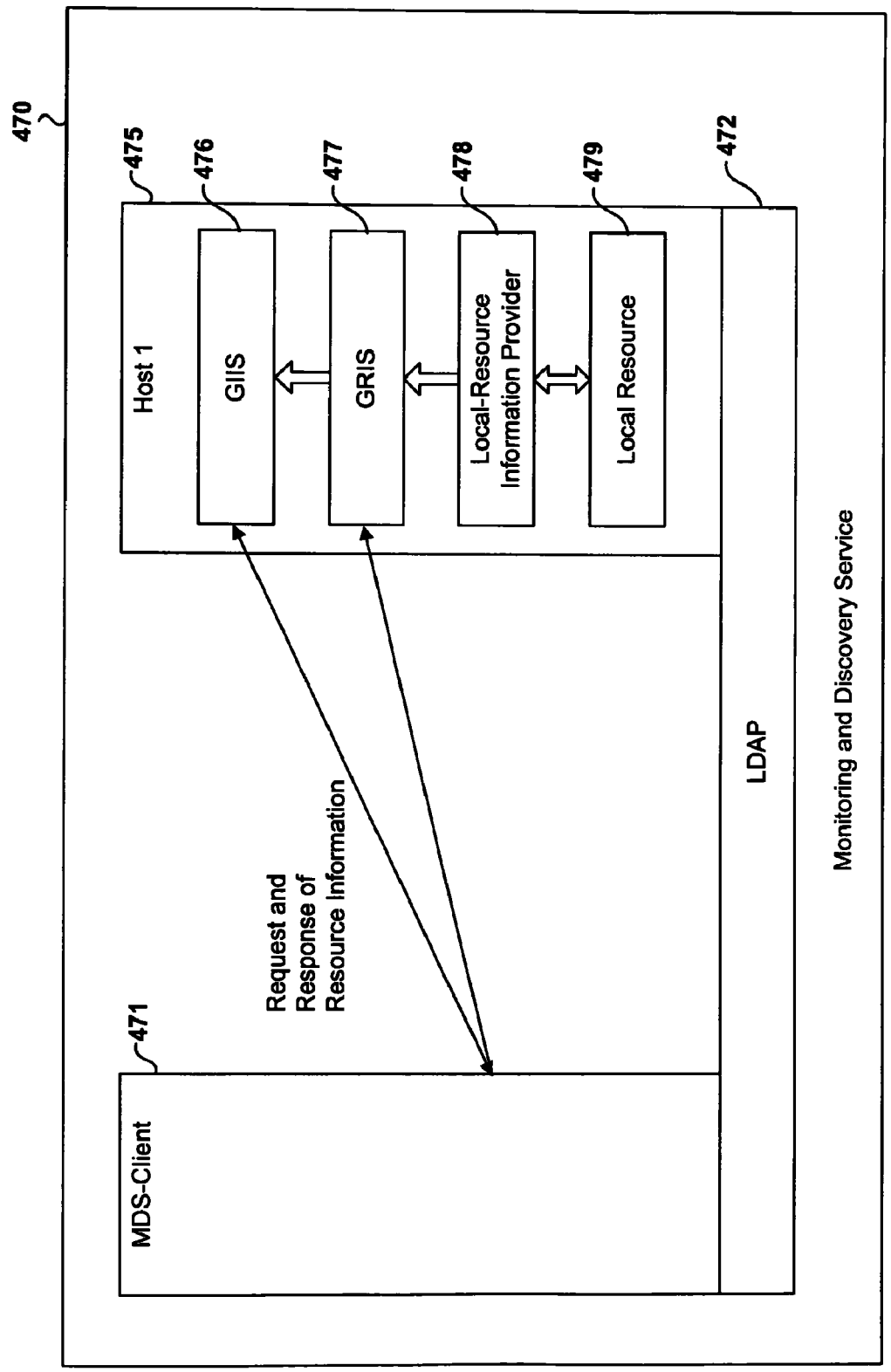

As shown in FIG. 26, the information service of Globus is realized via a monitoring and discovery Service (MDS) 470, which enables management of static and dynamic information about grid resources.

Requests between an MDS client and the information services components 475 running at different hosts use lightweight directory access protocol (LDAP) 472. The collection of information data is performed by several components running at the hosts. These are the grid information index service (GIIS) 476, which maintains hierarchical references to the resource information, and the grid resource information service (GRIS) 477, which provides the resource information. The resource information is passed from a local resource 479 to a local resource information provider 478, and then to the GRIS 477.

The inventive grid service broker extensions to the Globus architecture are now described. Globus itself does not provide any grid service broker functionality. Rather, the inventive grid service broker uses the Globus components as an alternative infrastructure mainly for the message service and the information service. Adaptation of the relevant grid service broker components to the Globus infrastructure components are described below.

Figure 27:
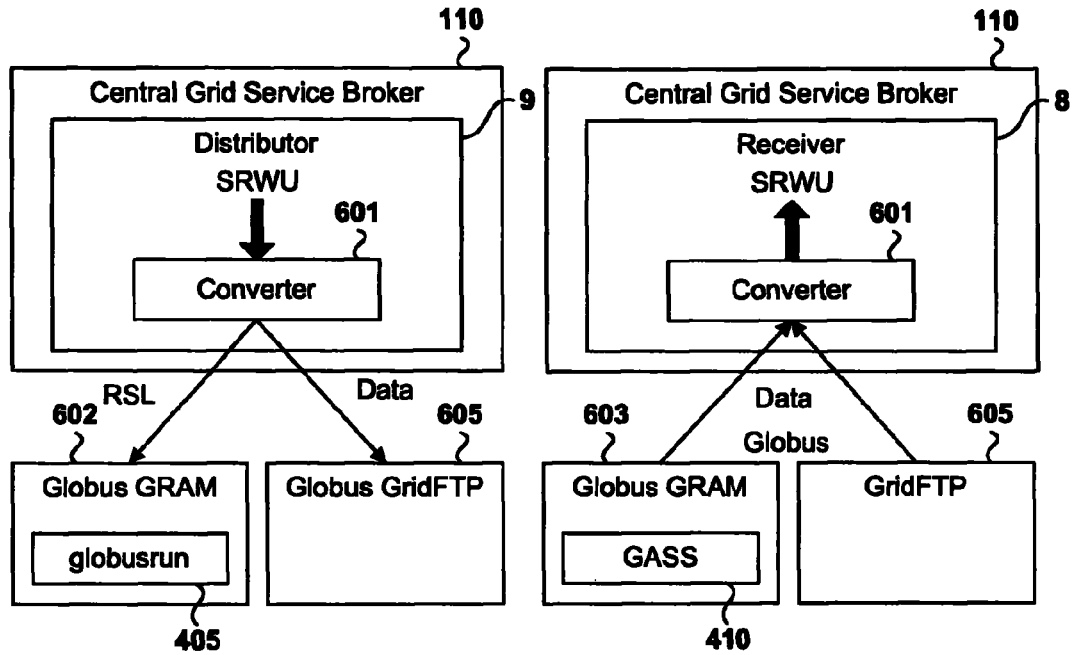
FIGS. 27-32 show a novel implementation of the inventive grid service broker in the Globus grid architecture.

FIG. 27 shows how the distributor 9 and receiver 8 components of the distributor, receiver, mediator 6 are add-ons to the Globus GRAM service described above to utilize it for the distribution of service requests. This can be done by using a converter 601 to adjust to the RSL scripts and the Globus data transfer. The converter 601 is operably connected to a Globus GRAM component 602 having globusrun 405, to a Globus grid FTP 605, and to a Globus GRAM component 603 having GASS 410.

Figure 28:
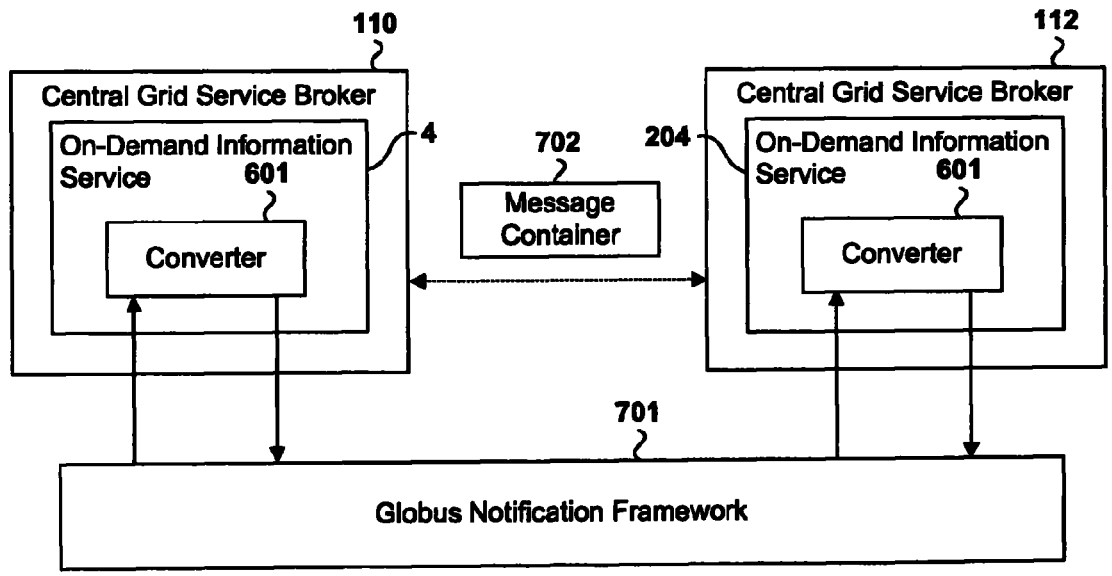

As shown in FIG. 28, the on-demand information service components 4 and 204 of the central grid service broker 110 and the distributed grid service broker 112, respectively, can use the Globus notification framework 701 to send and receive messages between the different grid service broker parts using a message container 702.

Figure 29:
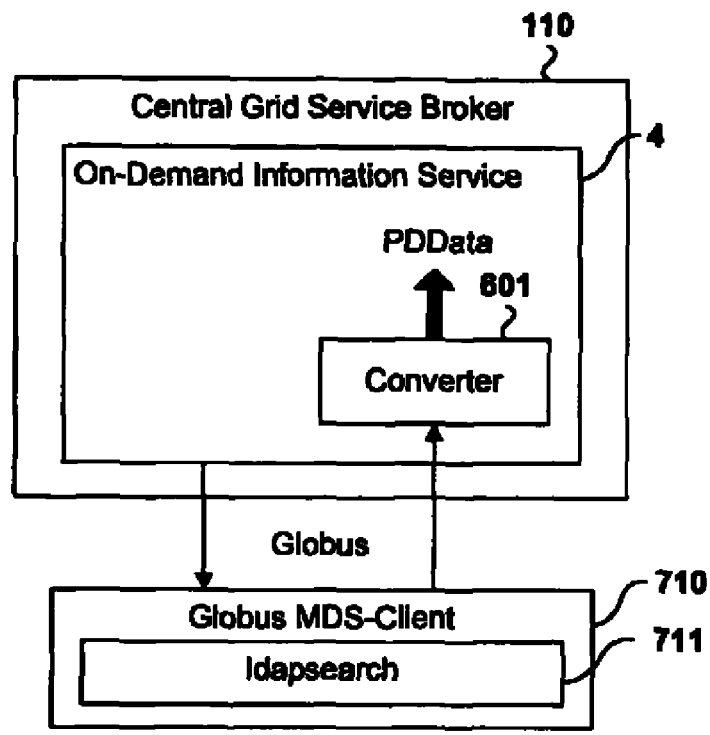

As shown in FIG. 29, the on-demand information service 4 of the central grid service broker is able to interface to a Globus MDS-Client 710 with ldapsearch 711, to complement the global bulletin board information provided by the distributed grid service broker.

Figure 30:
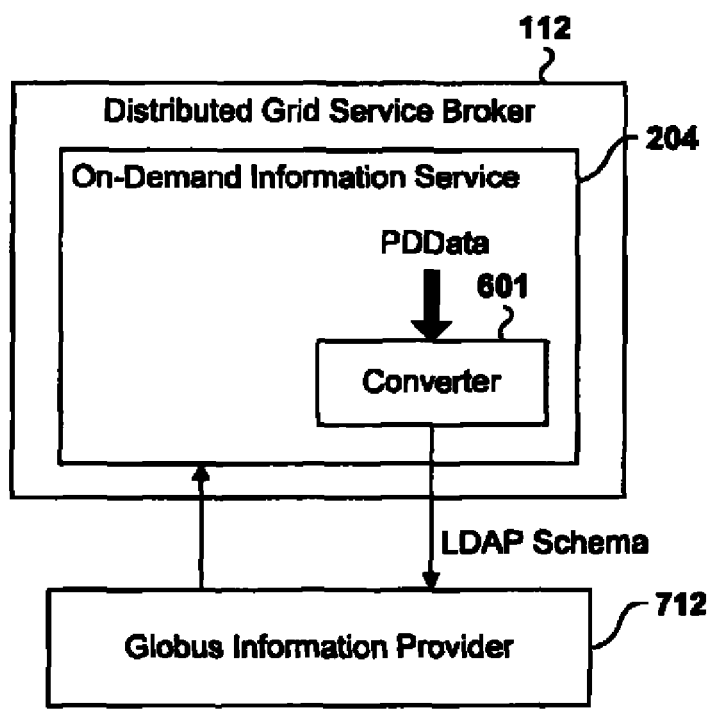

As shown in FIG. 30, the data service function of the on-demand information service component 204 of the distributed grid service broker 112 can use a converter 601 to adapt to the LDAP schema and the Globus data information provider 712. This can be used to announce data collected by the distributed grid service broker 112 to the Globus data service.

Figure 31:
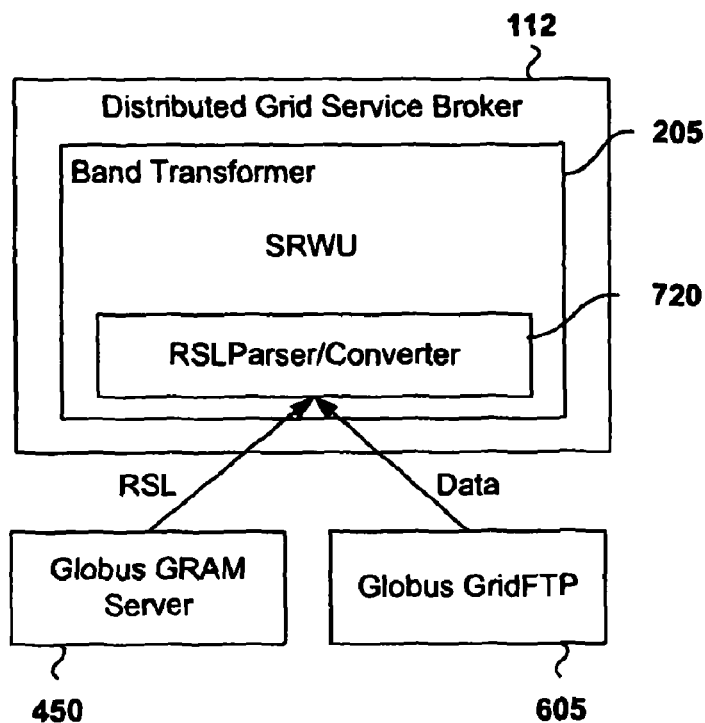

As shown in FIG. 31, the band transformer component 205 of the distributed grid service broker 112 may be extended to use a RSL-Parser/Converter 720 to receive Globus job streams by the GRAM server 450 and convert them into the SRWU format needed by the band transformer 205 for using the BDAFPD. The grid FTP 605 may be interfaced by the band transformer 205 to send and receive job data.

Figure 32:
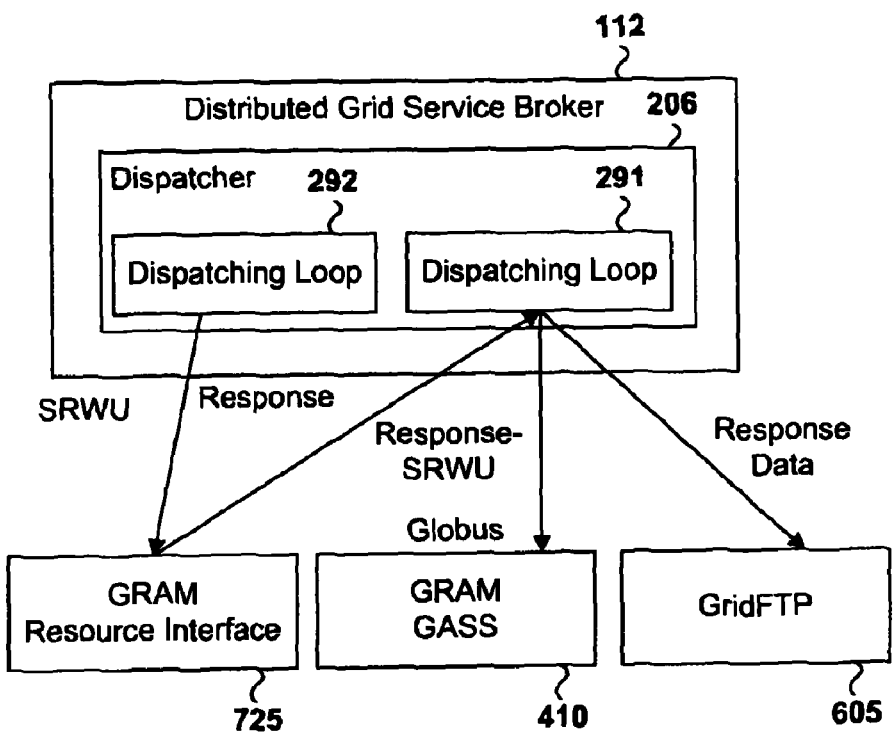

As shown in FIG. 32, for dispatching SRWUs to local resource and workload managers, the dispatcher component 206 of the distributed grid service broker may use the GRAM service interface 725, the GRAM GASS 410, and the grid FTP 605 to start and control jobs, and to send and receive job data.

A further explanation of the terms used above follows immediately below:

Service requestor: Demands computing service power from service providers to be used for processing individual service requests. The terms and conditions for processing the service requests are negotiated with the service broker which represents a service provider domain.

Service provider: Offers computing service power to service requesters. This can be based on a local or a global market scenario, depending on the individual contracts in place. The service broker represents an individual service provider according to a defined service provider domain.

Resource-centric: The classic approach to allocate resources in computing systems.

Service-centric: A new approach, introduced here, used by the service broker for allocating computing resources. The traditional resource centric approach is extended by the service broker to the level of service-centric trading of computing service power measured in service units.

Service power: A commodity which is traded by the service broker. The projected service units needed (PSUN) to process individual service requests in processing domains are used by the service broker to determine the service power to be traded. The computing service power is measured in service units.

Service request: An abbreviated form of a service power request or a service power reservation request forming a service request work unit (SRWU). It represents an individual request of a service requester to perform or plan the processing. The service request format is defined and used by the service broker. Usually, a service request correlates to individual business products or business processes, which are supplied or supported by a service provider. These are mapped to bands by the service broker. Transformation of individual types of requests such as, for example, Web services formats, customer-specific formats, and the like, to the service request format can be performed by a formatter service.

Service unit: The basic measurement unit of service power. Service units are defined and used by the service broker in a way to be resource-independent and to be generally transformable in a distributed, heterogeneous, computing environment. The trading of service power between service requestors and service providers is performed by a service broker component.

Service provider domain: A set of processing domains which uniquely belong to a service provider. A service provider domain represents the total service power supplied by a service provider to be used by the service broker for trading.

Processing-Domain: A cluster of computing power, which can be provided by heterogeneous systems such as grids or homogenous systems or by high performance clusters such as the IBM z/OS Parallel Sysplex, or any combination of these, forming a capacity of service power available for trading by the service broker. The characteristics such as, for example, total service power, band types supported, QoS, and the like, of the processing domain are filed in a processing domain profile (PDP). The processing domain represents a unique management domain owned by the distributed request broker part.

Service broker: For a service provider domain, the service broker applies a set of methods and functions to perform the trading of service power for a service provider. It is responsible for trading service power between service requesters and service providers.

Central service broker: For a service provider domain, applies a set of methods and functions to perform the trading of service power for the service provider domain and to globally optimize profit in the service provider domain.

Distributed service broker: For a single processing-domain, it applies a set of methods and functions to perform the trading of service power for the processing domain and to locally optimize profit of the processing domain.

Multi-Objective-Optimization: An optimization having multiple objectives or dimensions such as, for example, an optimization of the processing of service requests which have a given budget constrain, timeline, and QoS, to maximize profit for the service provider.

Service provider objectives: Parameters used to express the criteria from a service provider for processing service requests. The objectives can be, for example, to use the cheapest processing domain, to maximize throughput of standard businesses, to maximize the utilization of a processing domain or domains, to meet QoS and business SLAs, to use on-demand value for service request processing, and the like. These parameters are maintained in the provider service element (PSE) profile.

Business products: These are products offered by a service provider, specified in business terms such as, for example, travel booking, payment order processing, and the like. The products are defined with a fixed scope and quality. Usually business products are built on or supported by business processes to deliver the required functionality.

Business processes: Processes which support a specific type of business. There are several hierarchical levels of business processes. The level which supports a business product is called the master flow.

Reservation scheme: Applied methods and functions of the distributed service broker to handle the process of reservation for the planning of the traded service power.

Reservation slot: The basic reservation unit for service power, which is a fixed or variable capacity of service power in a single period of time. It is used by the reservation scheme to plan service requests for processing.

On-demand value: Expresses the market value of a service request for an individual processing domain. This takes into account the actual situation of the processing domain such as, for example, performance index, cost, QoS, reservation, and the like; the operational risk for processing such as, for example, QoS, penalties, expected future demand, and the like; and the competitive market situation such as mean price, equilibrium price, price strategy, and the like.

Performance index: A measure of how well a computing system, processing-domain, or service provider domain is performing against a given target. The target can be expressed in terms of utilization, response-time, QoS, velocity, and the like, or any synthetic value which could be a combination of multiple values.

Market value: The value measured in payment units which expresses the actual market price situation for a commodity.

BDAFPD: Band Distribution Algorithm for Processing Domains, which include a novel algorithm and set of methods introduced by the service broker to optimize profit of the service provider domains.

What is claimed is:

1. A system, comprising a processor coupled to a memory unit, wherein said memory unit stores a computer program implementing a service broker suitable for use in a heterogeneous distributing environment, wherein said processor is configured to execute instructions of said service broker, said service broker comprising a central service broker and at least one distributed service broker, both belonging to a service provider domain and being connected to each other via a communication infrastructure;

wherein said central service broker and said distributed service broker are service centric and measure service power in service units that are resource independent and transformable in a distributed heterogeneous environment;

wherein said central service broker uses a meta-scheduling service for distributing service requests to a dedicated distributed service broker managing a single processing domain, which requests are based on projected service units needed to process incoming service requests, wherein said meta scheduling service receives collected information from the distributed service broker, said collected information comprising information about projected service units needed to process the incoming requests and remaining service power capacity in service provider processing domains;

wherein distribution of said service requests to the distributed service broker is performed by a band mapping component of said central service broker that maps incoming service requests to specific bands, each band representing specific business products with an amount of service power measured in service units with an agreed quality of service, wherein each band can be dynamically configured by a band transformer, that is part of the distributed service broker, to set individual band boundaries; and wherein availability of service power measured in service units and the band transformer together allow resource independent and transformable economic distribution of service requests within a heterogeneous distributed computing environment.

2. The system according to claim 1, wherein said meta scheduling service uses an EOML3 economic optimization model scheduling policy.

3. The system according to claim 1, wherein said meta scheduling service is supported by an auction to establish market prices for the provided service power of individual bands.

4. The system according to claim 1, wherein said auction is a capacity sealed bid auction.

5. The system according to claim 4, wherein said distributed service broker uses an on-demand value calculation to represent processing domain specific market value for processing service requests and uses an on-demand value calculation in said capacity sealed bid auction.

6. The system according to claim 1, wherein said distributed service broker reserves service power according to service power requests and service power reservation requests.

7. The system infrastructure according to claim 6, wherein said distributed service broker reserves service power using reservation slots.

8. The system according to claim 1, wherein said heterogeneous environment is a grid environment.

9. The system according to claim 1, wherein bands are characterized by service power provided, quality of service, price and cost, dedicated resource manager, and business processes and business products supported.

10. The system according to claim 1, wherein said central service broker and said distributed service broker run within a service provider domain.

11. The system according to claim 1, wherein communication between said central service broker and said distributed service broker is provided by a grid infrastructure with TCP/IP using hyper sockets.

12. A method for providing computing service power in a distributed heterogeneous environment having a service requestor and service provider connected via a service broker, wherein the service broker distributes requests received from the service requester to the service provider, said method comprising:

receiving service requests from the service requestor;
mapping the service requests to multiple bands by the service broker;
projecting service units to be processed for the service requests on the mapped bands;
building a demand set of processing domains which have bands available sufficient for the service power needed;
requesting offers from a processing domain that is part of the demand set;
building, by a processor, a proposal set using received processing domain offers according to a best-fit scheduling strategy; and
accepting the proposal set to provide a reservation of service power for the accepted service request.

13. The method according claim 12, wherein mapping is based on quality of service power needed, and on business products and business process used.

14. The method according to claim 12, wherein projecting service units is based on historical time series analysis.

15. The method according to claim 12, wherein the demand set is based on filter criteria of a service provider strategy for scheduling service requests.

16. The method according to claim 15, wherein said filter criteria are selected from: using the cheapest processing domain, maximizing throughput, maximizing utilization of a processing domain, meeting quality of service and business service level agreements, and processing service requests using on-demand values.

17. The method according to claim 12, wherein offers are requested using a capacity sealed bid auction.

18. The method according to claim 12, wherein the proposal set is based on a best-price strategy, lowest performance index, and highest on-demand value, which are part of a service provider scheduling strategy.

19. The method according to claim 12, wherein accepting is performed by a reservation scheme that optimizes processing according to quality of service, utilization, and profit optimization targets, by smoothing peak load demands over time.

20. A computer program product for providing computing service power in a distributed heterogeneous environment having a service requestor and service provider connected via a service broker, wherein the service broker distributes requests received from the service requester to the service provider, the computer program product comprising a computer readable medium having computer readable program code tangibly embedded therein, the computer readable program code comprising:

computer readable program code configured to receive service requests from the service requestor;
computer readable program code configured to map the service requests to multiple bands by the service broker;
computer readable program code configured to project service units to be processed for the service requests on the mapped bands;
computer readable program code configured to build a demand set of processing domains which have bands available sufficient for the service power needed;
computer readable program code configured to request offers from a processing domain that is part of the demand set;
computer readable program code configured to build a proposal set using received processing domain offers according to a best-fit scheduling strategy; and
computer readable program code configured to accept the proposal set to provide a reservation of service power for the accepted service request.

21. The computer program product according claim 20, wherein mapping is based on quality of service power needed, and on business products and business process used.

22. The computer program product according to claim 20, wherein projecting service units is based on historical time series analysis.

23. The computer program product according to claim 20, wherein the demand set is based on filter criteria of a service provider strategy for scheduling service requests.

24. The computer program product according to claim 23, wherein said filter criteria are selected from: using the cheapest processing domain, maximizing throughput, maximizing utilization of a processing domain, meeting quality of service and business service level agreements, and processing service requests using on-demand values.

25. The computer program product according to claim 20, wherein offers are requested using a capacity sealed bid auction.

* * * * *